United States Patent [19]

Lee et al.

[11] Patent Number: 4,475,013

[45] Date of Patent: Oct. 2, 1984

[54] REPERTORY AUTOMATIC TELEPHONE DIALING APPARATUS WHEREIN A NAME AND TELEPHONE NUMBER ARE SEARCHED BY DEPRESSING ONE OR MORE LETTER CODE KEYS

[75] Inventors: Thomas K. P. Lee; Yue C. Cheng, both of Kowloon, Hong Kong

[73] Assignee: International Quartz Ltd., Hong Kong, Hong Kong

[21] Appl. No.: 377,333

[22] Filed: May 12, 1982

[51] Int. Cl.³ .......................................... H04M 1/274
[52] U.S. Cl. .............................. 179/90 BD; 179/90 B; 179/18 BA
[58] Field of Search ........... 179/90 BD, 90 B, 90 BB, 179/18 BA, 5 P, 1 MN, 175.2 C, 2 BC, 7.1 R

[56] References Cited

U.S. PATENT DOCUMENTS

| | | | |
|---|---|---|---|
| 4,260,855 | 4/1981 | Rubinstein | 179/7.1 R |
| 4,277,651 | 7/1981 | Fisher et al. | 179/90 BD X |
| 4,341,929 | 7/1982 | Alexander et al. | 179/90 BD X |

Primary Examiner—Stafford D. Schreyer
Attorney, Agent, or Firm—Thomas R. Virgil

[57] ABSTRACT

The automatic telephone dialing apparatus or repertory telephone dialer system includes a microprocessor, a keyboard and control and routing circuits coupled to and between the keyboard, the microprocessor, an incoming telephone line, and a telephone unit. The keyboard has a plurality of pushbutton keys, each one of which, when depressed, causes the automatic dialing of a predetermined number. Pairs of names and numbers are stored within an internal memory of the microprocessor such that, by depressing keys representing the first few letters of a name, one may find, and cause automatic dialing of, a number corresponding to that name. The system also includes a timer, a redial timer, an alphanumeric display, and means for listing out the stored names on the display, and for searching through a series of names that have the same first several numbers or where the names have the same first several letters.

21 Claims, 14 Drawing Figures

U.S. Patent   Oct. 2, 1984   Sheet 1 of 10   4,475,013
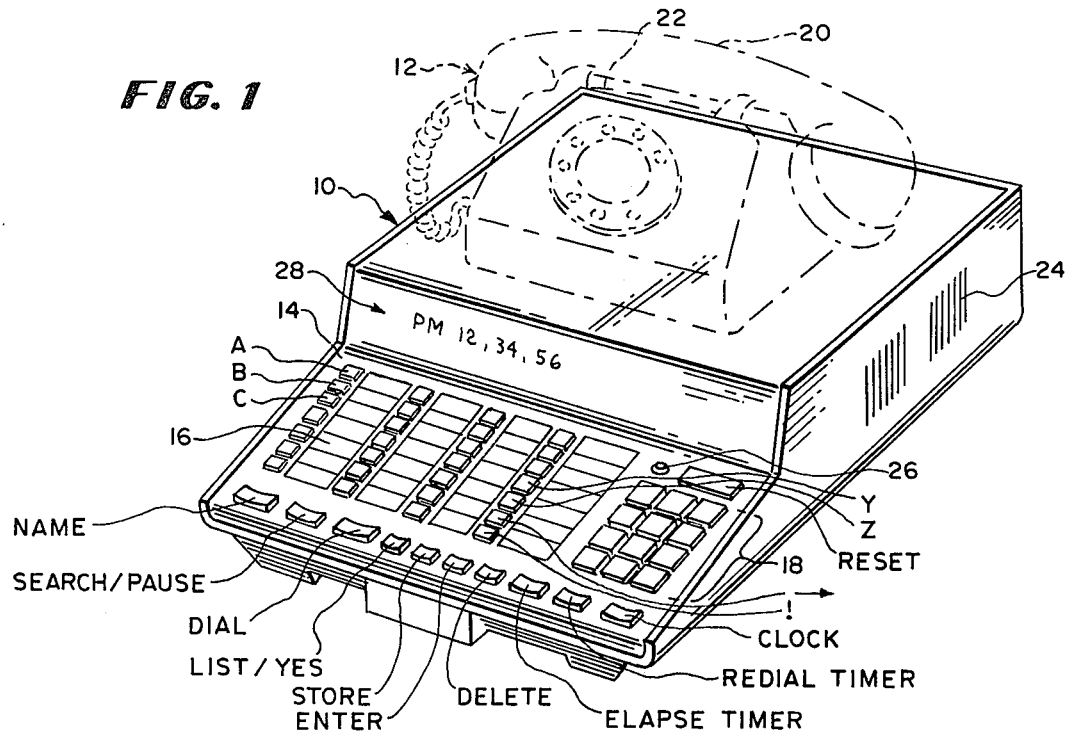
FIG. 1
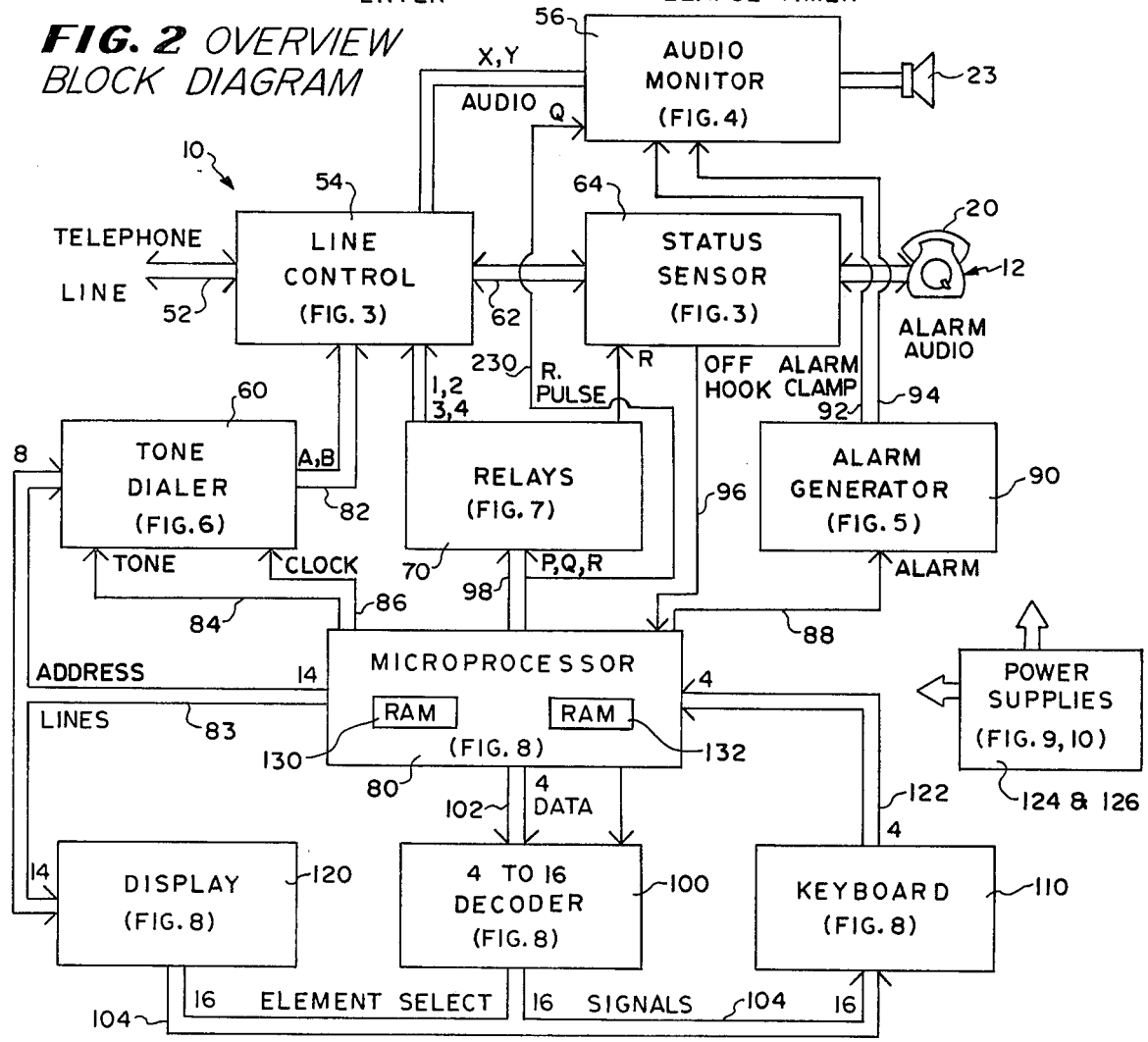
FIG. 2 OVERVIEW BLOCK DIAGRAM

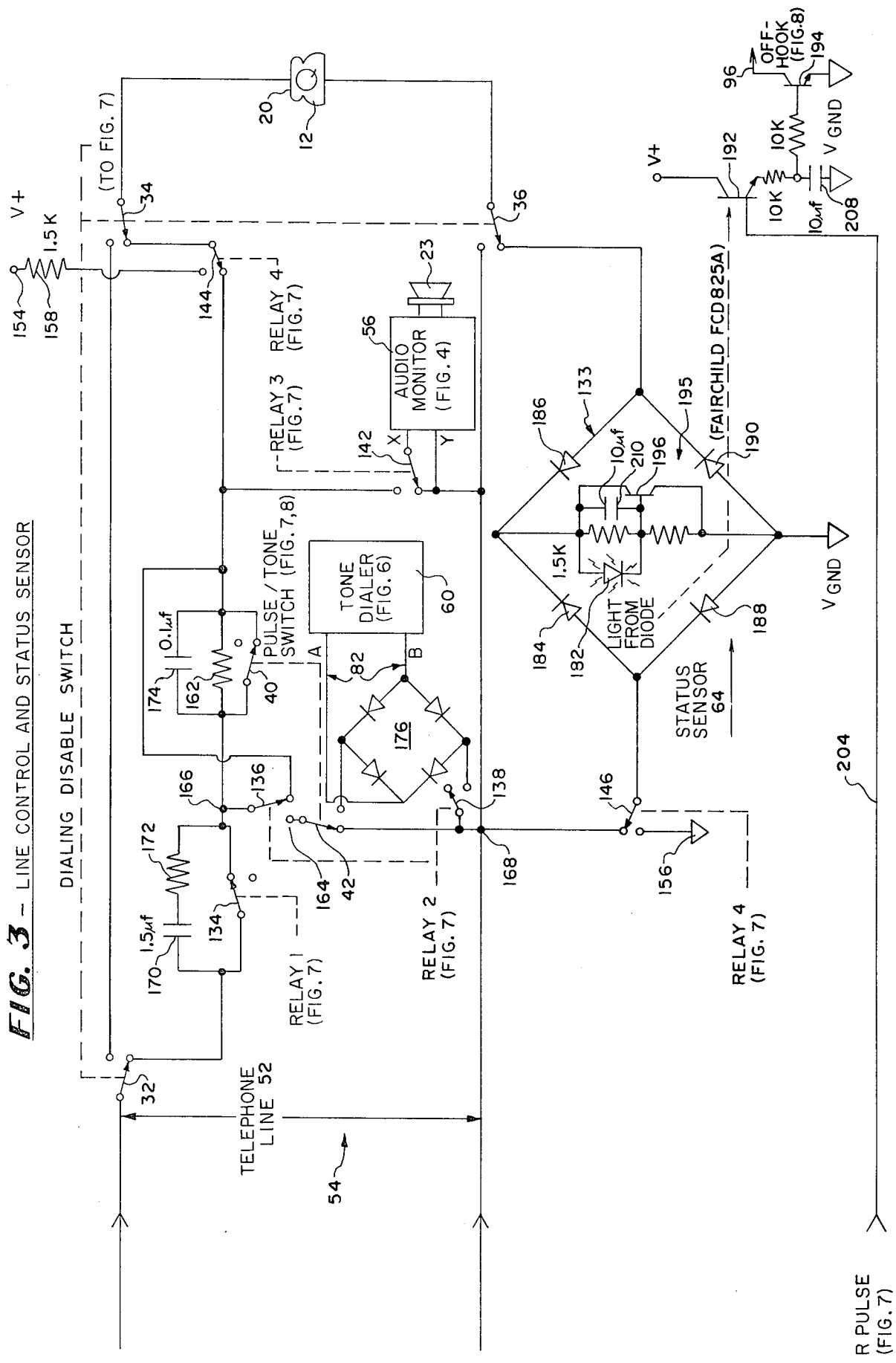

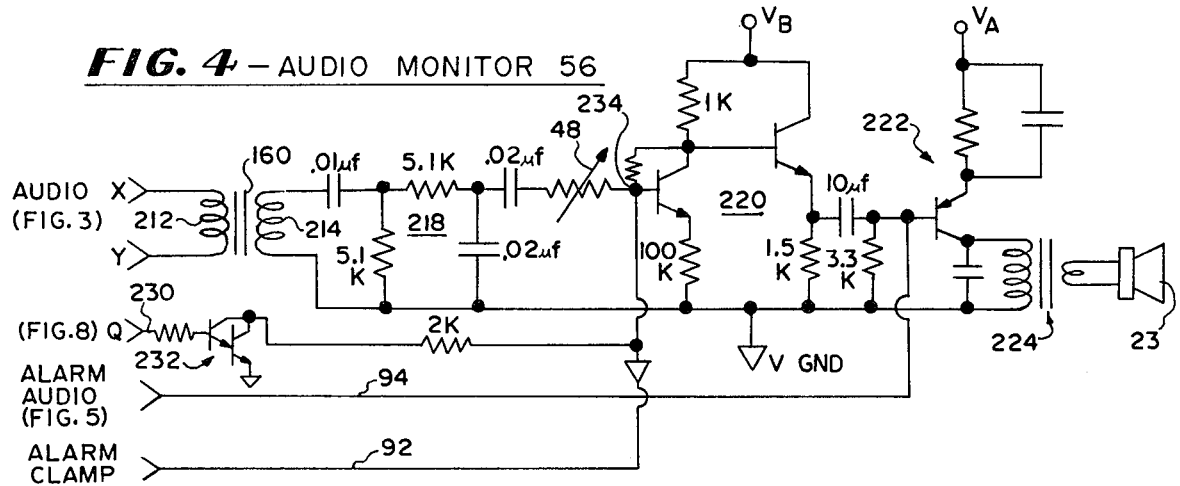
FIG. 4 — AUDIO MONITOR 56
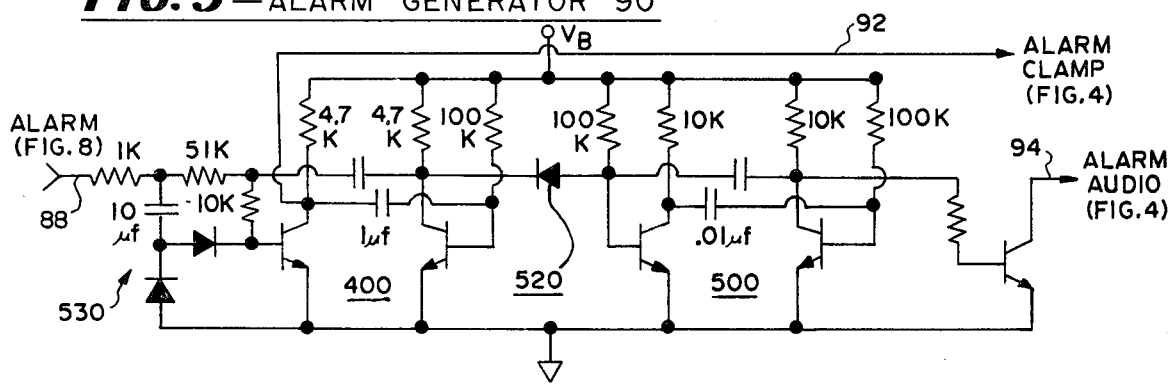
FIG. 5 — ALARM GENERATOR 90
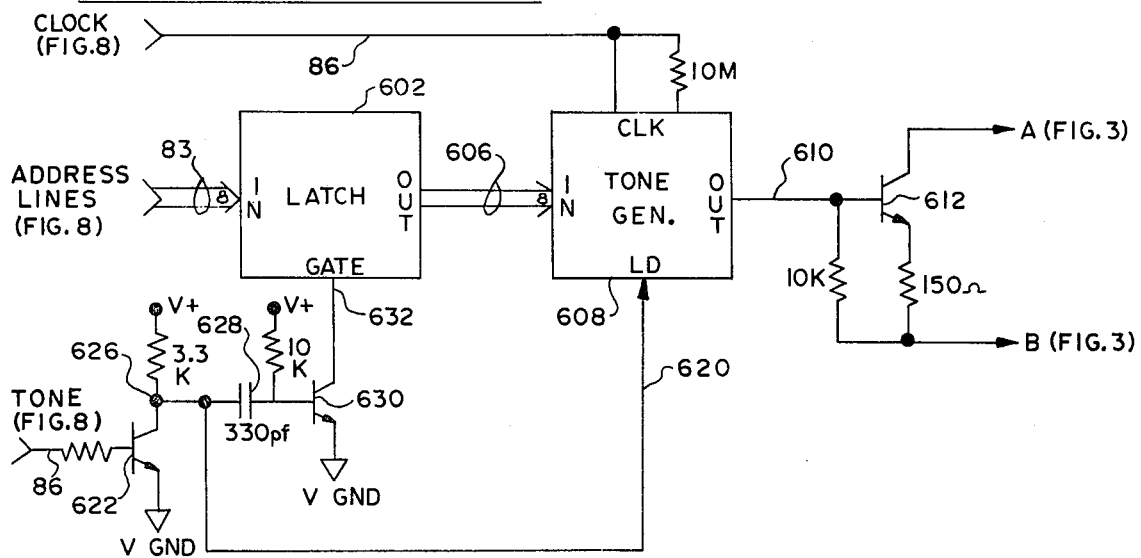
FIG. 6 — TONE DIALER 60

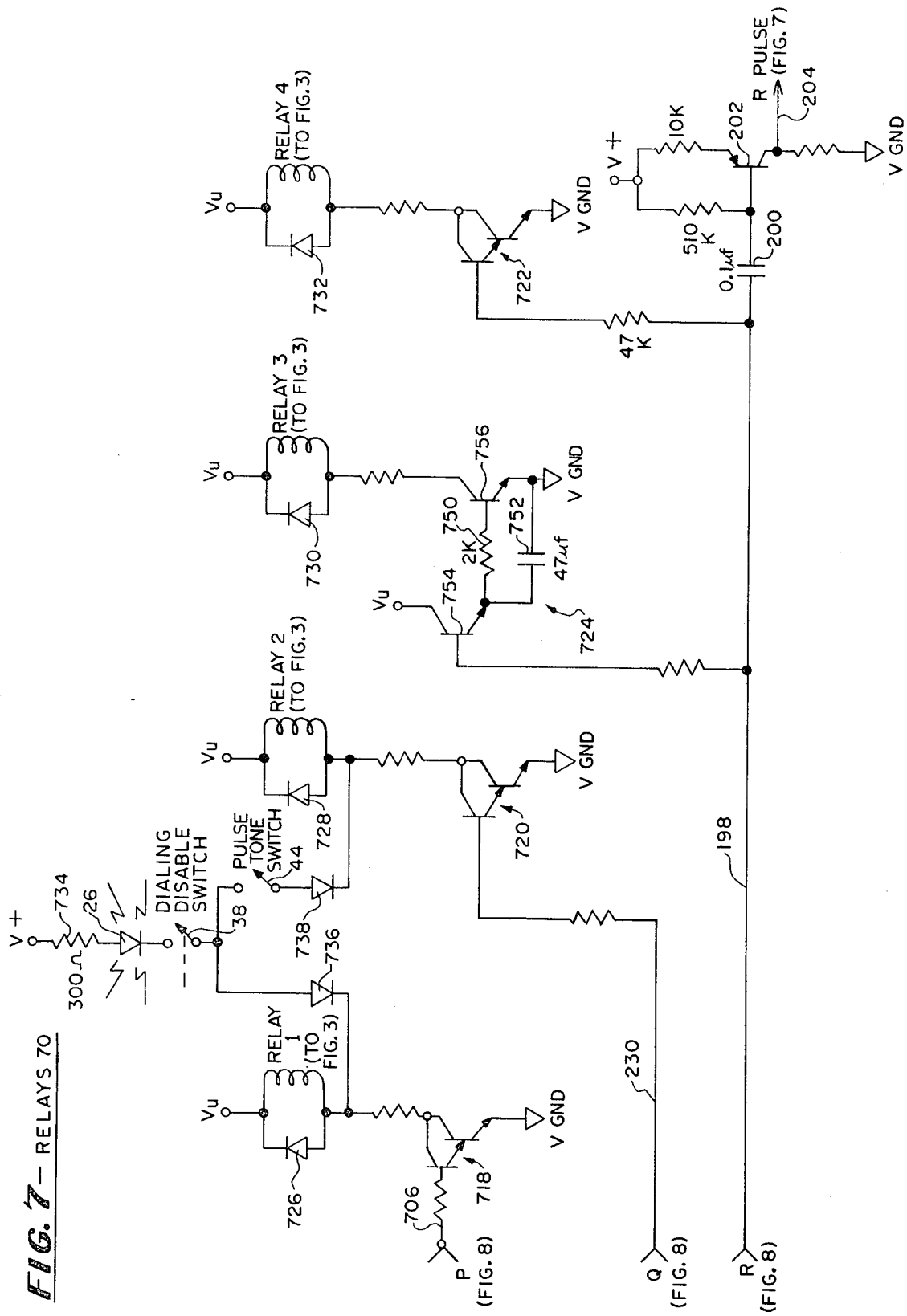

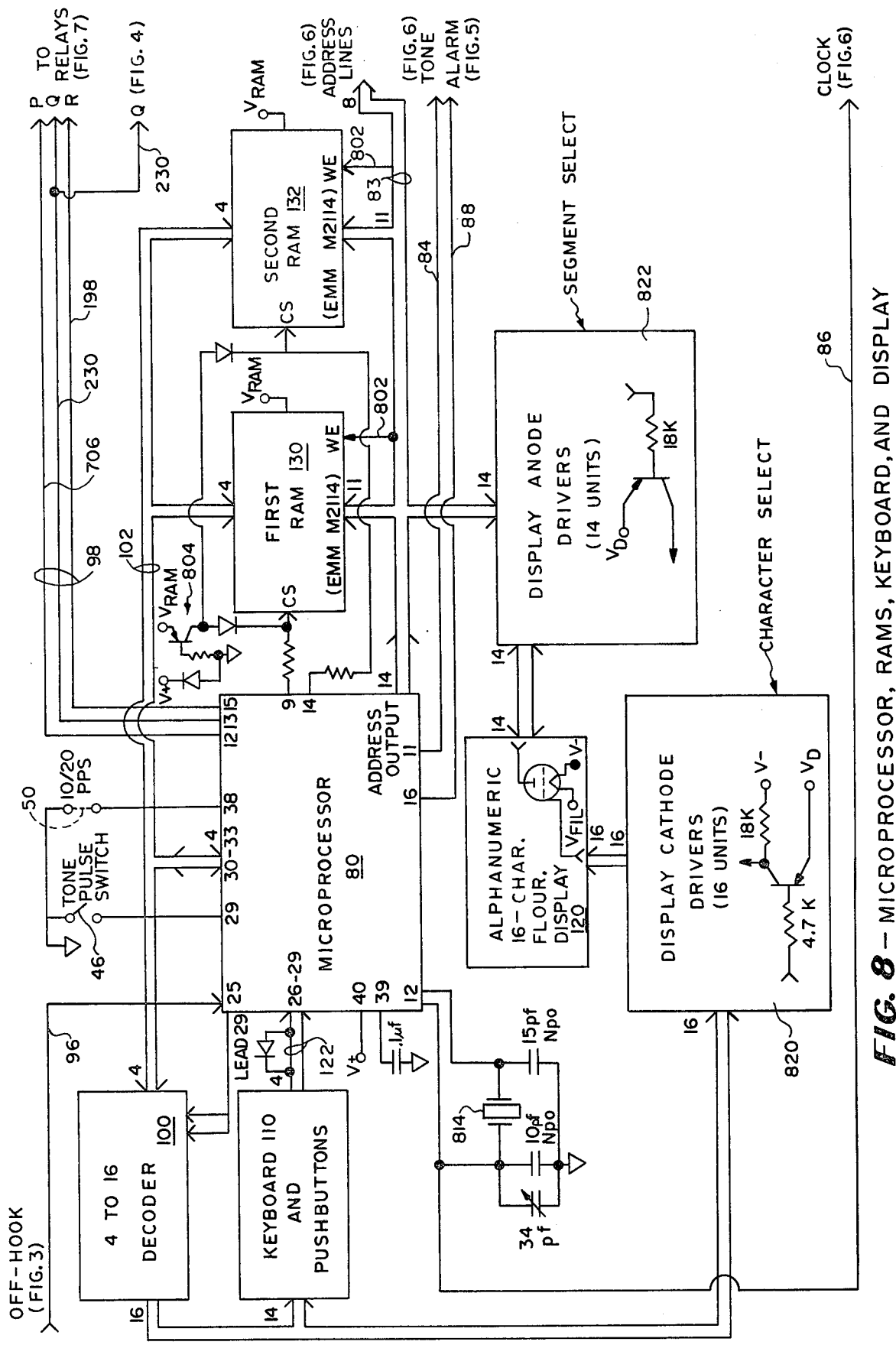
FIG. 8 – MICROPROCESSOR, RAMS, KEYBOARD, AND DISPLAY

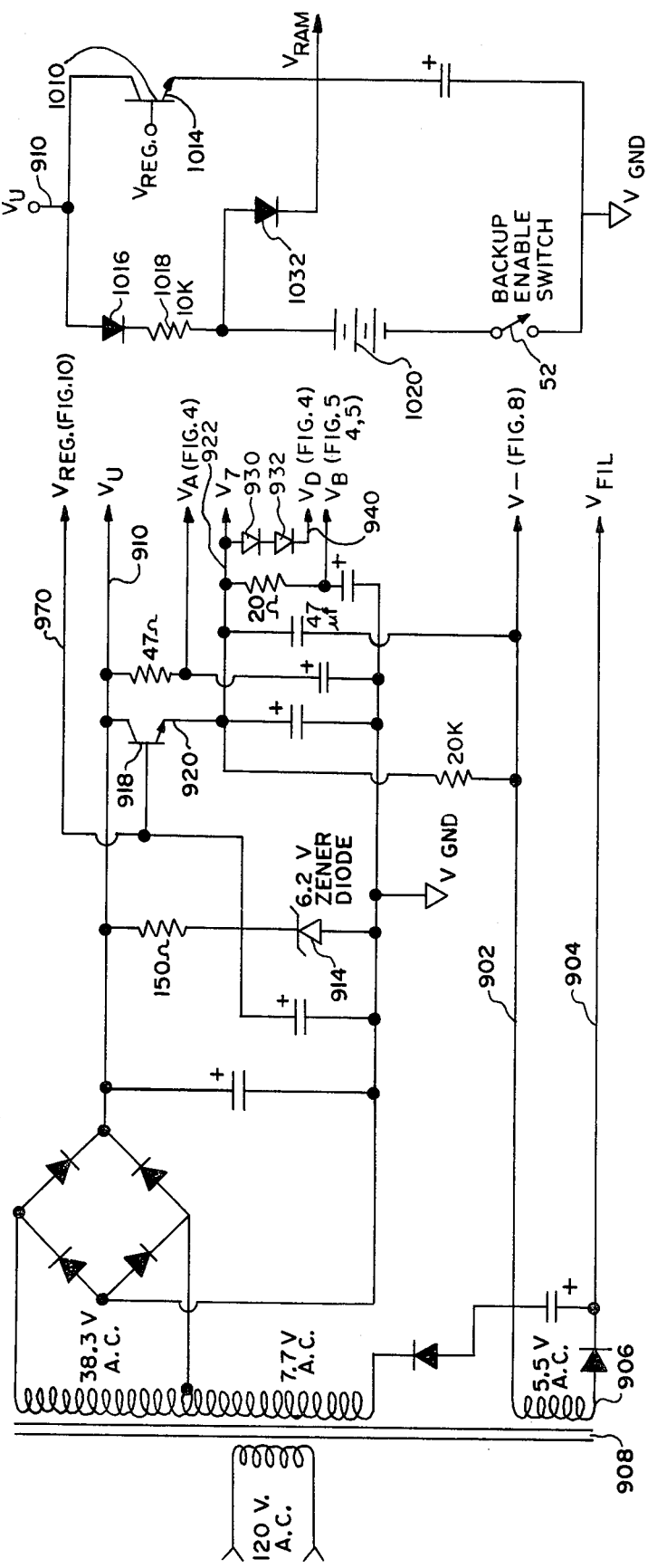

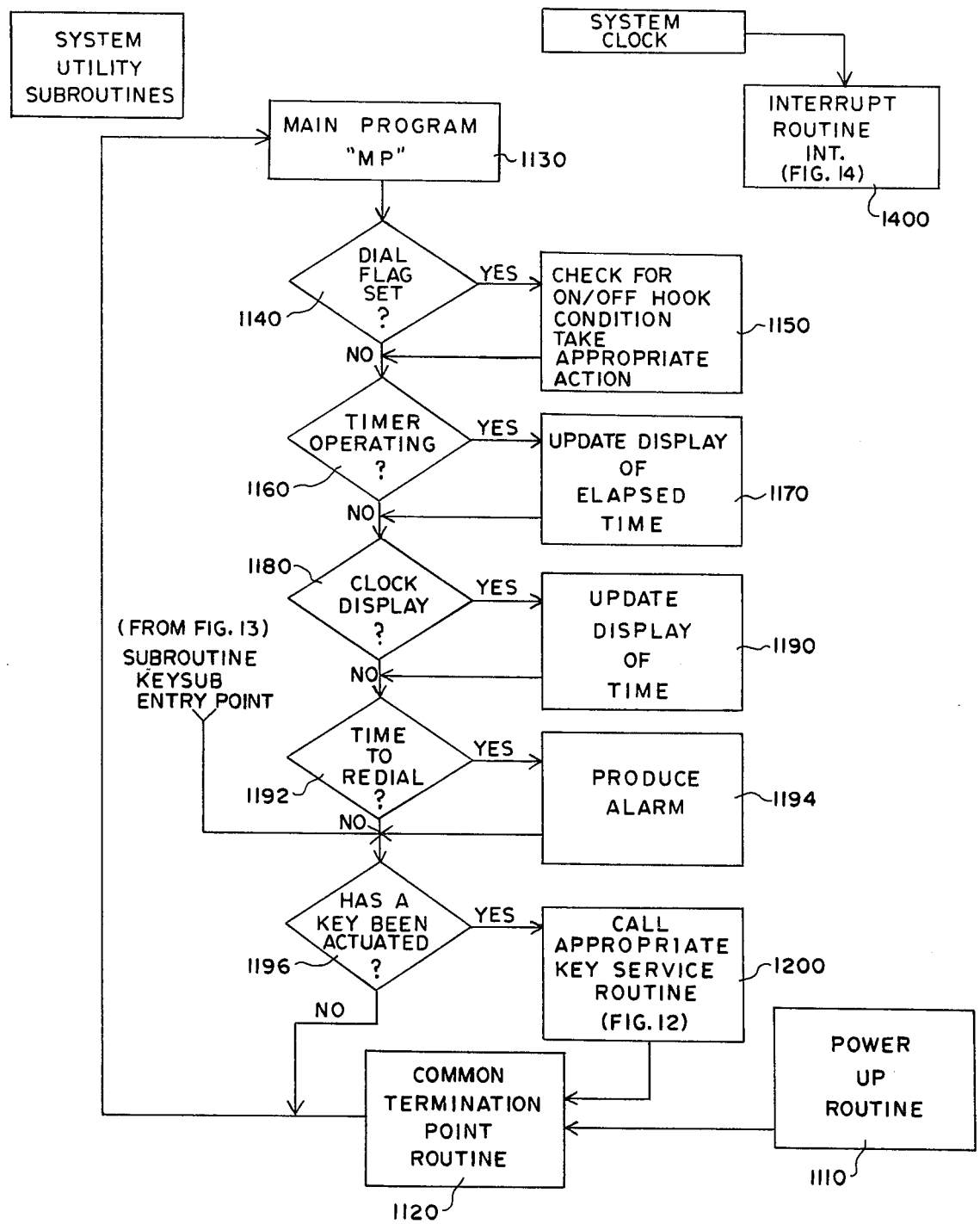
FIG. 11 - FLOW DIAGRAM OF PROGRAM SYSTEM

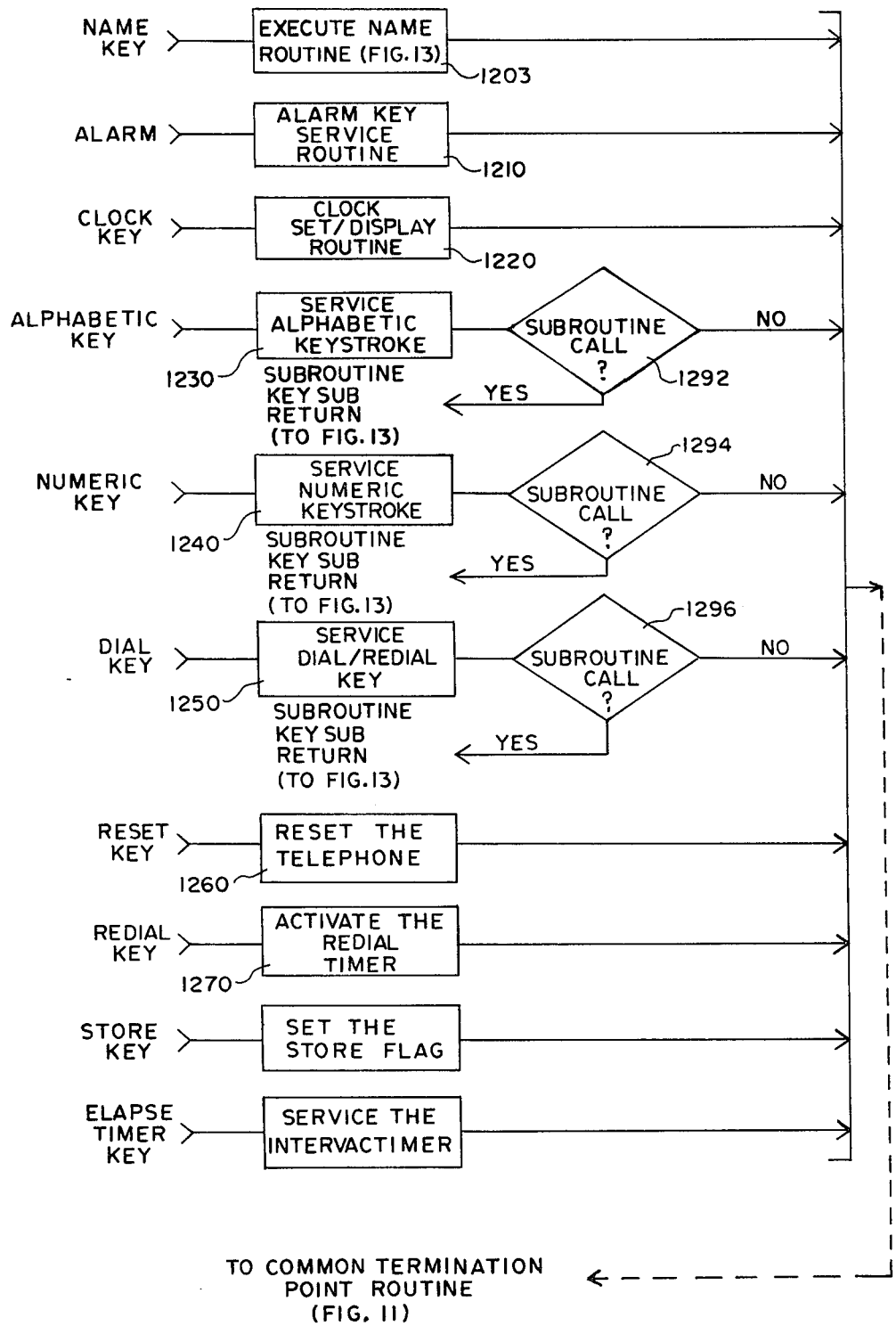
FIG. 12 - KEY SERVICE ROUTINES

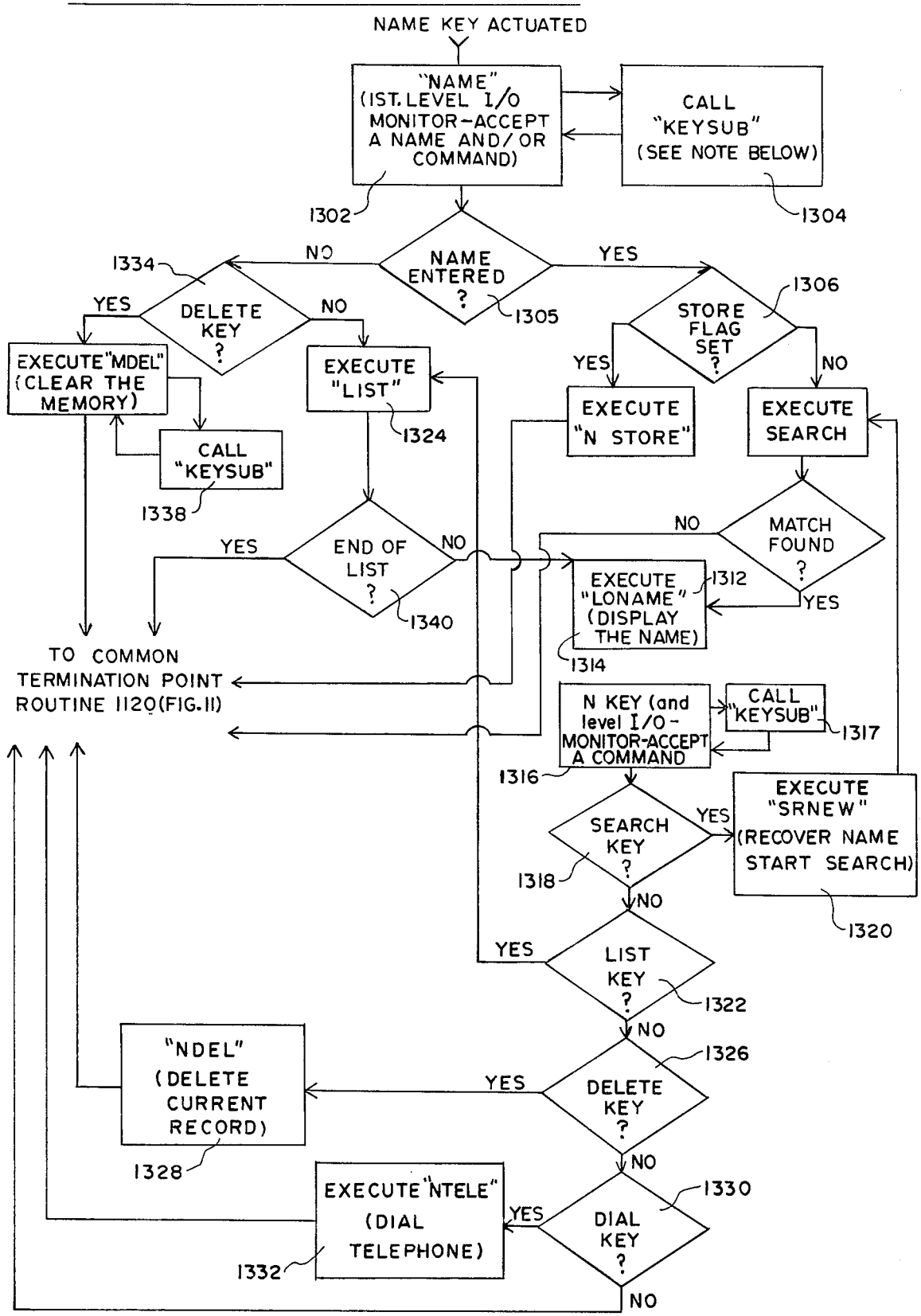
FIG. 13 — NAME ROUTINE FLOW DIAGRAM
NOTE: ENTRY TO "KEYSUB" SUBROUTINE IS IN FIG. 11
RETURNS FROM "KEYSUB" SUBROUTINE ARE IN FIG. 12

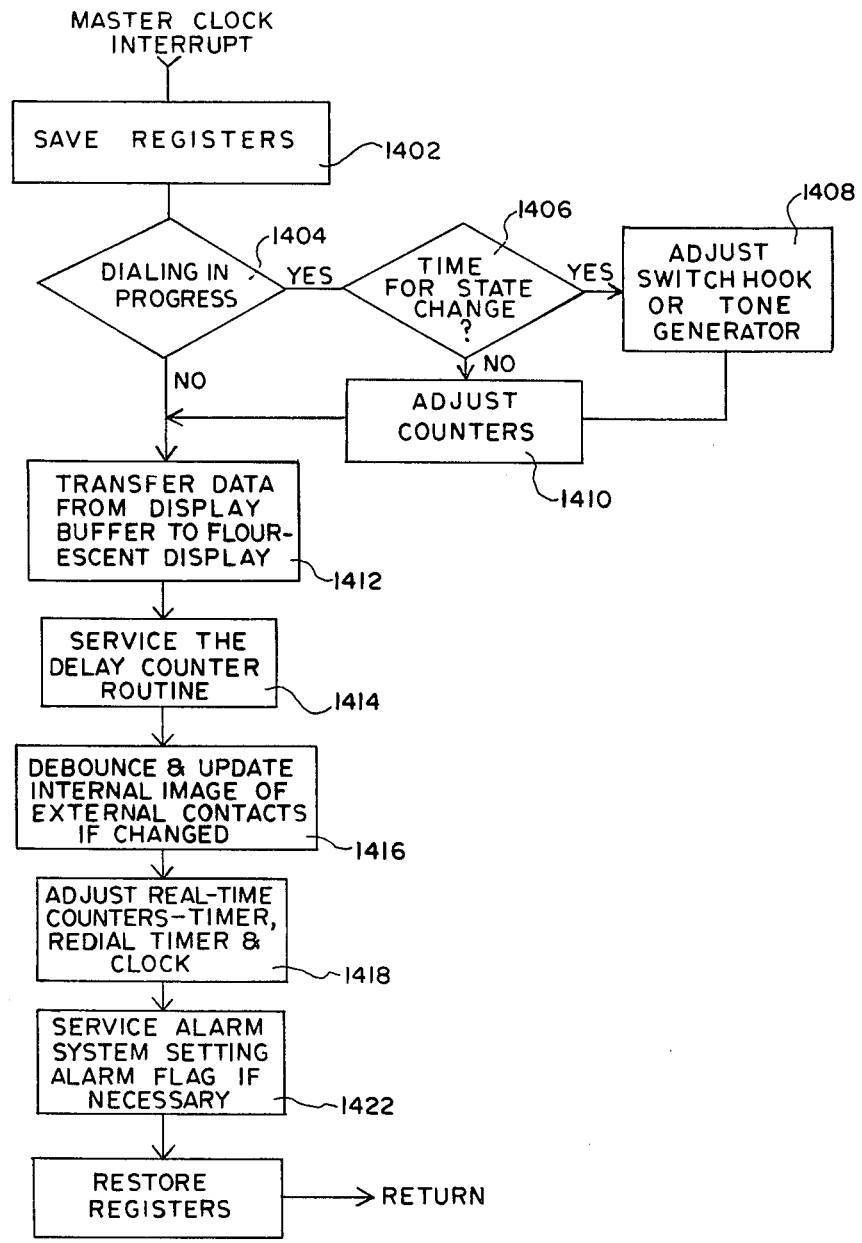

REPERTORY AUTOMATIC TELEPHONE DIALING APPARATUS WHEREIN A NAME AND TELEPHONE NUMBER ARE SEARCHED BY DEPRESSING ONE OR MORE LETTER CODE KEYS

BACKGROUND OF THE INVENTION

1. Field of the Invention

The present invention relates generally to an automatic telephone dialing system and more particularly to a repertory dialer system providing automatic dialing of a relatively large number of different stored telephone numbers either by a single manual operation by a user or else by the user searching for a stored name in a name and number memory.

2. Description of the Prior Art

Telephone repertory dialers are accessories that can be connected to standard telephones to automate the dialing of frequently used numbers that are stored in the dialer. Such dialers enable one to initiate a telephone call by depression of a single button. Often such dialers also include features which enable a number once dialed to be remembered so that if the calling party does not answer or if the called line is busy, redialing of that same number may be initiated by the simple actuation of a single button at a later time.

A wide variety of telephone repertory dialers already exist. Examples of such previously proposed dialers are disclosed in the following U.S. Patents:

| U.S. PAT. NO. | PATENTEE |
| --- | --- |
| 3,555,201 | Kuehnle |
| 3,670,111 | Bukosky, et al. |
| 3,885,108 | Zock |
| 3,998,550 | Ts'ao |
| 4,029,908 | Moseley et al. |

The Kuehnle Patent, No. 3,555,201, discloses an electromechanical arrangement wherein a plurality of rotary switches may be set to store, within a unit, the numbers for a number of frequently dialed destinations. On the upper panel of the unit there is a pushbutton corresponding to each of these numbers which may be labeled with the name of the organization or person corresponding to the stored number. By depressing one of these pushbuttons, one causes the associated switch to be scanned such that the number represented by the setting of the switch is transmitted out over the telephone line as touch tones or pulses.

The Bukosky et al. Patent, No. 3,670,111, discloses a more sophisticated arrangement wherein the settable switches are replaced with an electronic memory that may be loaded by typing the numbers in upon a keyboard and storing them within the memory. This apparatus operates similarly to the Kuehnle apparatus but is far simpler to load with numbers since such numbers are simply typed in upon a keyboard rather than set by means of rotating individual switch elements. In addition, Bukosky et al. includes a "last number dialed" memory which preserves a record of the last number that has been dialed so that by pressing the corresponding pushbutton, this number may be redialed again. This last feature is useful in cases where the phone called was busy or did not answer such that redialing can be initiated at a later time by simple actuation of a single button.

The Zock Patent, No. 3,885,108, discloses a modem device for facilitating the interconnection of a computer terminal to a telephone line which has the capacity to store only one number. However, this patent discloses timer means for automatically causing this number to be redialed a number of times if the first attempt to establish communication is unsuccessful.

The Ts'ao Patent, No. 3,998,550, also discloses a repertory dialer having a plurality of buttons. A magnetic drum is used for storing pulse-tone coded reprentations of the digits, and the arrangement is a hybrid electromechanical device.

The Moseley et al Patent, No. 4,029,908, discloses an arrangement that does not have a plurality of pushbuttons on its upper surface, as in several of the arrangements described above. Instead, Mosely et al. discloses a device having a magnetic ribbon stored within it, the upper surface of which is exposed to view and can accept typed or handwritten names and the undersurface of which is suitable for the recording of digits. The Mosely et al. apparatus contemplates capturing the digits typed in on the keyboard in a register and then transferring the contents of the register onto the back of the magnetic strip at a position corresponding to where, on the front of a strip, a name has been written by the operator. By positioning the tape so that a particular name is visible, one can then cause the corresponding set of digits to be scanned off the tape, loaded into a register, and sent out over the telephone lines, either in pulse tone or touch tone format. This device has a very large capacity for names but it requires those names to be listed on the tape in alphabetical order and a slow, linear search of the tape is required to find any particular name. Additionally, it is possible for names to become so compressed adjacent each other on the tape that either the alphabetical order must be violated when new names are added or else the entire loading of the tape with names must be repeated due to lack of room at a particular location on the tape.

A review of the devices disclosed in the above patents indicates that repertory dialers having pushbuttons on their front panels are fairly well known in the art. However, there remains a need for repertory dialers having a much larger capacity and providing an accelerated way in which the number corresponding to a particular name can be found within a memory, retrieved and then used to control the automatic dialing of the number.

In addition, many of the prior art devices disclosed above include complex electromechanical arrangements having many moving parts which can contribute to maintenance problems and also add to the expense of manufacturing such devices. The use of complicated, discreet logic circuits is also evident in the above devices, as is the excessive use of complex logic for converting numbers into a form suitable for storage on a magnetic tape, additional complex logic for reading those tapes, and reading heads and the like which add to the complexity of these devices.

SUMMARY OF THE INVENTION

The repertory-automatic telephone dialing apparatus of the present invention has a simplified structure such that it is inexpensive to assemble while providing a large memory capacity to store numbers and an efficient mechanism for finding those numbers.

The dialer apparatus includes means for associating names with telephone numbers and for searching for a particular name within such a memory when a particular number is to be dialed.

Also, with the dialer apparatus, new numbers and names may be added to the memory of the system at any time without fear that certain portions of the dialer's memory will become overly crowded such that the names cannot be found in an efficient manner.

According to the invention there is provided a repertory automatic telephone dialing apparatus wherein a name and telephone number are searched by depressing one or more letter code keys comprising: a housing; a keyboard on said housing including push-button keys for at least all letters of the alphabet and numbers 0-9, and further including a NAME key, a SEARCH key, a DIAL key and a REDIAL key; a microprocessor situated in said housing including read only memory (ROM) and random access memory (RAM); a program in said microprocessor for operating the microprocessor to store in, or recall from, said RAM a name and telephone number pair; coupling circuit means for coupling the microprocessor to and between a telephone unit and an incoming telephone line; a keyboard circuit coupled between said keyboard and said microprocessor; said keyboard circuit in conjunction with said programmed microprocessor, being operable upon the depression of a key code to store a name/number pair, to recall a name/number pair or to cause dialing of a predetermined telephone number related to a code for the number when said code is punched in on said keyboard, said code including at least one letter associated with a pushbutton key which can be a letter of the name of the person being called; alphanumeric visual display means coupled to and between said microprocessor and said keyboard, and situated behind a screen on said housing above said keyboard for displaying names and numbers stored in said memory and for displaying the name and/or number being called when the code is punched in on said keyboard, means including said programmed microprocessor for causing, upon actuation of said NAME key, one of said letter keys and said SEARCH key, searching of a name, and, upon finding the desired name/number which is displayed on the visual display means and upon actuation of said DIAL key, dialing of the named person's telephone number; means including said programmed microprocessor for causing, upon actuation of one of said letter keys for a letter/name/number combination stored in said RAM, display of at least the telephone number on the visual display means and automatic dialing of said number; and means including said programmed microprocessor for causing, upon actuation of said REDIAL key, an alarm to be given after a short period of time signifying that redialing of a last dialed number should be initialed.

Stated otherwise, the repertory dialer apparatus includes a keyboard with a set of pushbutton keys, each of which can be associated with a number, a storage mechanism into which pairs of names and telephone numbers may be loaded and a searching mechanism for later searching for the particular name and automatically dialing the associated number.

In addition to the usual complement of pushbutton keys found on repertory dialers, the dialer system is augmented by the addition of a visual display that can display both alphabetic and numeric characters.

Also, in addition to facilities for associating numbers with each of the pushbutton keys, the system permits one to enter a name into the display and thereafter enter a corresponding number into the display and then have that number and name stored within an internal memory. The names and numbers may be entered in any random order and stored within the memory until its capacity is exceeded.

The system can also include searching logic for searching through the memory for a particular name. The logic is designed so that one needs only to touch the first letter or series of letters in the name and then the device will search through the memory until it finds a name that begins with a specified letter or letters. If several names begin with the same combination of letters, the device permits one to browse quickly through the memory, looking at each of the names in sequence, until the proper name is found, at which time one actuates a DIAL pushbutton key to cause the desired number to be dialed by the system.

Provision is also provided whereby all names and numbers stored within the memory may be displayed.

The same repertory dialer system can further include a "redial timer" that may be set to sound an alarm after a predetermined delay period and to set up the repertory dialer system to redial, upon actuation of a single pushbutton, a number dialed at a time when the phone at the receiving end either did not answer or was busy.

A timer preferably is provided for timing the duration of long distance telephone calls.

To achieve a low cost system which can be readily manufactured and which contains a minimum number of parts, the repertory telephone dialer system of the present invention contemplates constructing the repertory dialer system around a microprocessor containing a repertory of programmed instructions stored in a permanent memory and having associated therewith a random access memory in which names and telephone numbers may be stored. By concentrating the control logic into the microprocessor, the remaining logic of the system is greatly simplified so that only a set of relays and relay drivers, a touch tone generator and logic for monitoring need to be added as external components.

The microprocessor can also be arranged to scan the panel pushbutton keys and to display both alphabetic and numeric information on a display on a front panel of the system. This design permits a far more sophisticated design to be achieved in which great attention can be paid to the "human engineering" aspects of system design, so that ease of use and simplicity of use can be maximized.

An Audio Monitor circuit having an output speaker is preferably provided in the system so that ringing of a dialed number and the answering voice can be heard without picking up the telephone handset and then upon lifting the telephone handset off the "hook" the Audio Monitor circuit is uncoupled from the system.

Additionally, logic and circuitry are provided for maintaining the line connection between the incoming telephone lines and the telephone unit when the Audio Monitor circuit is uncoupled from the incoming lines.

BRIEF DESCRIPTION OF THE DRAWINGS

FIG. 1 is a perspective view of a repertory telephone dialer system or automatic telephone dialing apparatus designed in accordance with the teachings of the present invention and is shown connected to a standard telephone.

FIG. 2 is an overview schematic block diagram of the repertory telephone dialer system of the present invention and shows all of the elements, in block form, of the dialer system with reference in each block to the Fig. in which a circuit diagram of that element is shown.

FIG. 3 is a schematic circuit diagram of the telephone Line Control and Status Sensor of the dialer system of the present invention and shows all of the relay contacts that are connected to the telephone lines.

FIG. 4 is a schematic circuit diagram of the Audio Monitor which amplifies and presents to the speaker sounds received from the telephone line and alarm signals.

FIG. 5 is a schematic circuit diagram of an Alarm Generator suitable for generating an alarm message.

FIG. 6 is a schematic circuit diagram of the Tone Dialer which may optionally be used to generate tone dialing signals.

FIG. 7 is a circuit diagram of the logic circuit that drives all of the Relays whose contacts are shown in FIG. 3.

FIG. 8 is an overview block and schematic circuit diagram of the Microprocessor and associated logic elements including random access memory modules, and shows the logic circuitry that drives the fluorescence display as well as the keyboard and telephone pushbutton array.

FIG. 9 is a schematic circuit diagram of the Main Power Supply of the repertory dialer system.

FIG. 10 is a schematic circuit diagram of the Memory Power Supply and shows backup batteries that allow the dialer system to retain its memory in the event of a power failure.

FIG. 11 is an overview Flow Diagram of the Program System that is programmed into a read only memory within the Microprocessor.

FIG. 12 is a detailed breakdown of the Key Service Routines that service the various key strokes that can be made upon the front panel of the repertory dialer system.

FIG. 13 is a highly detailed Flow Diagram of the Name Routine of the key service routines that responds to actuation of the "name" key on the front panel of the repertory dialer and that plays a key role in storing new names and numbers within the repertory dialer system and in finding names and sending out dial pulses corresponding to the numbers stored with such names.

FIG. 14 is a flow diagram of the Interrupt Routine which, when placed into operation periodically by the system master clock, oversees the generation of dialing signals, the transfer of data to the fluorescent display, and the servicing of the various timers and counters that form elements of the telephone repertory dialer system of the present invention.

DESCRIPTION OF THE PREFERRED EMBODIMENT

An automatic repertory telephone dialer system, a automatic telephone dialing apparatus or simply "dialer", designed in accordance with the teachings of the present invention is identified by reference numeral 10 in FIG. 1 and is shown attached to a conventional telephone 12. A cable (not shown) that normally connects directly to the back of the telephone 12 is plugged into a receptacle (not shown) at the back of the dialer 10 and a short cable (not shown) connects another receptacle (not shown) on the dialer 10 to a receptacle on the back of the telephone so that the repertory dialer 10 is interposed between the standard telephone 10 and the telephone network.

The dialer 10 has a front panel 14 upon which is located a plurality of pushbuttons "A", "B", "C", etc. In the drawings these pushbuttons are labelled with the same labels they bear on an actual embodiment of the dialer 10 rather than with reference numerals. In this respect, four rows each containing seven pushbuttons arranged in a vertical row are shown labelled "A", "B", "C", ..., "Y", "Z", "→", "!". These twenty eight pushbuttons constitute a standard alphabetic keyboard that includes, in addition to the twenty six letters, an arrow key "→" which serves as a space key and an exclamation mark key "!" which is intended for storage of emergency numbers. Adjacent to each of the keys "A", "B", "C", ... on the front panel 14 is a space 16 whereon a name may be printed of a corresponding individual or company. The name may be typed on a label and secured in one of the spaces. Logic, which will be described hereinafter, enables one to associate with each of the twenty eight pushbuttons, a telephone number such that actuation of any of the twenty eight pushbuttons causes the corresponding telephone number to be dialed.

To the right side on the front panel 14 shown in FIG. 1 there is a standard telephone numeric keyboard 18 that includes the digits "1" through "0" as well as the "*" and "#" keys that are to be found on most modern pushbutton telephones. The numeric keyboard 18 may be used to dial numbers in the same manner that the keyboard or dial mechanism on the telephone 12 is used.

Also, a telephone number may be dialed without removing the handset 20 of telephone 12 from its cradle 22. The dial tone, the dialing and the ringing are all audible through a loudspeaker 23 (FIG. 2) positioned behind a grating 24 in a side of the dialer 10. When the party at the other end answers, then the handset 20 may be picked up and used, at which point the loudspeaker 23 behind grating 24 is inactivated so as not to interfere with the conversation.

Then, when the handset 20 is returned to its cradle 22, the call is automatically disconnected.

A plurality of pushbuttons are located along the lower front edge of the front panel 14. Proceeding from left to right, these button are described as follows.

The NAME searching and button initiates a name dialing operation. The SEARCH button initiates a search for the name and the corresponding telephone number. The DIAL button dials the number that has been most recently dialed using numeric keyboard 18 or that corresponds to the name that has just been found following a search. The LIST/YES button allows one to list out the names stored in the internal repertoire memory one at a time, and it is also used to supply the answer YES when the entire name memory is to be cleared, as will be explained in more detail below.

The STORE button is depressed whenever a new number is to be stored associated with one of the buttons labelled "A", "B", etc. or whenever a new name-number combination is to be entered into the memory. The actual storing of a name and number or a name and number pair within the system's memory is only carried out when the ENTER button is depressed as will be explained in more detail below. The DELETE button is pressed to delete a particular number or name and number combination from the memory and thus performs the opposite function of the ENTER button. The ELAPSED TIMER button controls the operation of an internal system timer. Depressing this button once displays the current time expired on the timer. Depressing it a second time halts the timer leaving the total amount of time stored within the timer. Depressing it a third time reinitiates the timer to zero and recommences the timing operation. The REDIAL TIMER button is depressed when a call has not gone through to store the number called in a special register and to cause the system's internal alarm to ring three minutes later and adjusts the repertory dialer so that actuation of the DIAL pushbutton automatically initiates the redialing of the number after the required delay. A second actuation of the REDIAL TIMER pushbutton cancels the redialing alarm.

The CLOCK pushbutton causes a time to be displayed on the face of the system display and also may be used to readjust the setting of the internal system clock.

A special RESET pushbutton functions in the same manner as the cradle hook switch on a standard wall telephone or pushbutton in the cradle 22 of a standard desk telephone and permits one to disconnect from an ongoing conversation at any time without hanging up the telephone handset 20.

A light emitting diode 26 indicates when dialing is in progress. In the course of pulse dialing, the diode 26 blinks with each diode pulse. In the case of touch tone dialing, the light glows momentarily as each digit is transmitted over the telephone line.

A fluorescent display screen 28 is situated above the panel 14 and has the capacity to display up to sixteen letter or numbers on the face of a fourteen-element fluorescent display for each character position. The display screen 28 permits not only numbers to be displayed but also names associated with those numbers. The provision of this display screen 28 not only ensures the accuracy of names and numbers entered into the system's memory but also greatly facilitates the searching for names through the system's memory by displaying names found so that the user can verify whether or not the name found is the one he or she wishes to call.

In addition to the above described function buttons, the two special buttons "*" and "#" in the numeric keyboard 18 also perform certain functions. The "*" button is typed as part of a phone number at the point where there is a need for an access pause, as, for example, following the digit "9" in a number which must dial "9" first to gain access to the general telephone network. The "*" causes the unit to pause in its dialing to give the telephone system time to respond to a transition from one telephone network to another. The "#" button may also be used when the system is dialing a number to prolong the duration of the ringing tone for sixty seconds. The repertory dialer 10 normally rings a phone for only thirty seconds and then hangs up and stops ringing. But, if the "#" button is depressed, ringing continues for 60 seconds.

The dialer 10 includes several other controls on its back panel which are not apparent from FIG. 1. In this respect, mounted on the back panel is a DIALING DISABLE SWITCH or ON-OFF SWITCH comprising a gang of three two pole, double throw switches 32, 34 and 36 shown in FIG. 3 and a one pole, single throw switch 38 shown in FIG. 7 which are operated conjointly and permit one to disconnect the repertory dialer 10 from the telephone 12 so that the telephone is connected directly to the incoming telephone line and behaves just as if the repertory dialer 10 were not present.

A PULSE TONE switch is situated within the dialer 10 and comprises a gang of two one pole, single throw switches 40 and 42 shown in FIG. 3, a one pole, single throw switch 44 shown in FIG. 7 and a one pole, single throw switch 46 shown in FIG. 8. Closing of these gang switches 40, 42, 44 and 46 permits the dialer 10 to be adjusted for pulse transmission or for multiple tone transmission, in accordance with the requirements of a particular telephone system.

A volume control 48 in the form of a rotary thumb switch, hidden from view on the side of the dialer 10 and schematically shown in FIG. 4, allows the volume of the audio monitor to be adjusted; and an internal jumper 50 (FIG. 8) within the dialer 10 allows the rate of dial pulse generation to be set at either 10 or 20 pulses per second, whichever is the national standard in the location for the telephone 12 with which the dialer 10 is to be used.

And, finally, switch 52 shown in FIG. 10 and positioned within the casing of the dialer 10 permits one to select whether or not rechargeable batteries are to be used to back up the memories in case of power failure.

The repertory dialer 10 is used in the following fashion. First, to erase all name and phone number pairs from its internal memory, one depresses the NAME button, then the DELETE button and finally when prompted with the message ERASE MEMORY Y/END, one depresses the LIST/YES button. The name and number memory is then emptied and the dialer system 10 is ready for the entry of new names and numbers. This procedure clears the memory when the unit is first placed in operation. To enter a phone number into the repertory dialer 10 and to associate it with one of the twenty eight pushbuttons labelled "A", "B", "C", etc., one presses the STORE button followed by whichever of the twenty six keys one wishes to associate the number with. The display screen 28 then displays the message NO.PLS. to prompt you to supply the telephone number. One then types in the phone number using the numeric keyboard 18. As each digit is entered, it is displayed on the display screen 28 for verification. Also, the "*" is inserted at points where there should be a pause, such as after the digit "9" at the beginning of a sequence dialing out of a private PBX system. Then, to have the telephone number recorded and associated with the button indicated, one must press the ENTER button. The message NO.STORED is displayed to indicate that the number has been accepted and stored within the dialer system 10. To store a name and phone number pair within the memory, not associated with any of the front panel pushbuttons, one proceeds as follows: First, one presses the STORE button and then one depresses the NAME button. A prompt NAME PLS. appears to remind one to enter the name. One then types in the name, using the alphabetic portion of the keyboard and striking the "→" key at any point where a space is to be inserted. As it is typed, the name appears on the display screen 28. One then depresses the ENTER button and then a prompt NO.PLS. appears to remind one that it is now time to enter the telephone number. One then uses the numeric keyboard to enter the telephone number as has been explained. A second actuation of the ENTER pushbutton then causes the name and telephone number to be stored and the message NO. STORED to be displayed as confirmation of this fact.

To dial a number associated with one of the alphabetic keys labelled "A", "B", etc., one merely actuates the desired pushbutton. There is no need to pick up the handset 20. In response, the dialer system 10 automatically displays the number associated with that pushbutton on the display screen 28. Then, after a pause sufficient to ensure a dial tone has been received, the dialer 10 begins dialing the number. The Light Emitting Diode 26 flashes with each dial pulse and with each touch tone dial signal that is transmitted, and the display screen 28 highlights the digits by displaying which digit is being transmitted next. One can hear the telephone ringing through the monitor speaker. When the other party answers, one lifts up the handset 20 and carries on a normal conversation. The conversation may be terminated by replacing the handset 20 or alternatively by depressing the RESET pushbutton on the front panel 14 of the repertory dialer 10.

To dial a telephone number that is associated with a name, one depresses the NAME pushbutton such that the prompt NAME PLS. appears on the display screen 28. One then types in one or more letters of the name that is to be searched for. The letters typed appear on the display screen 28. One then actuates the SEARCH pushbutton and causes the repertory dialer 10 to automatically search through its memory of names to find the first name that begins with the letter specified. That name is then displayed on the display screen 28 and the repertory dialer 10 pauses. If that is the correct name, one then depresses the DIAL pushbutton and the associated number is then displayed and automatically dialed as described above. If the wrong name is displayed, then one simply enters the first one or two letters of the name again and depresses the SEARCH button one or more times to reinitiate the search through the remainder of the memory until the proper name is found.

To delete a number from its association with one of the letters "A", "B", etc., one depresses the STORE button followed by the button that is to have its number removed followed by the DELETE button. To erase a name and number pair, proceed as if to dial the number associated with the name, but depress the DELETE button rather than the DIAL button.

The CLOCK button causes the time of day (in hours, minutes and seconds) to be displayed. To set the time depress the STORE and CLOCK buttons in succession, thereby eliciting the TIME PLS. prompt. Then type an "A" (for "AM") or "P" (for "PM") followed by the time in hours, minutes and seconds (e.g., P 05 45 00). Then strike ENTER.

The REDIAL TIMER button, when actuated, initiates a three-minute timer. After three minutes, an audible alarm is given off and the message REDIAL PLS. appears. Depression of the DIAL button then causes the automatic dialing of the number dialed three minutes before. A second actuation of the REDIAL TIMER button actuates a stop watch or timer. A first actuation displays the timer count. Second and subsequent actuations of this button alternately reset, start and stop the timer.

Set forth below is a brief description of the main circuit elements of the dialer 10 of the present invention which are illustrated in block form in FIG. 2.

More specifically, FIG. 2 is a schematic block circuit diagram of the repertory dialer 10. The main elements in this block circuit diagram and their interconnections will now be breifly described, it being understood that a more detailed description of the details of each individual logic module or subcircuit will be described in more detail hereinafter in connection with the description of the Fig. in which that subcircuit is shown in more detail.

Following the subcircuit descriptions is set forth an overview description of the program system followed by a detailed description of the program listings.

Referring now to FIG. 2, the incoming telephone line at 52 flows through a Line Control logic 54 which contains the relays that control switching of the line, the generation of the dial pulses and connection of the line to both an Audio Monitor 56 and a Tone Dialer 60. The telephone lines then flow at 62 to Status Sensor 64 and on to the telephone receiver 12.

The Status Sensor 64 contains the logic that senses whether or not the telephone 12 handset 20 is "on hook" or "off hook". All of the logic that connects directly to the telephone line is contained in the Line Control 54 and in the Status Sensor 64.

Relay contacts in the Line Control 54 are controlled by Relays 70 which in turn are controlled by signal leads "P", "Q" and "R" which flow from a Microprocessor 80. The Tone Dialer 60 supplies pulse tones to the Line Control 54 over the lines 82 (A,B). The Tone Dialer 60 itself is in turn controlled by address lines 83 which flow from the Microprocessor 80 and determine what tone is generated and also by a TONE signal transmitted over a line 84 from the Microprocessor 80. This TONE signal determines when tones are to be generated. The Tone Dialer 60 also requires clock pulses from the Microprocessor 80 which flow over a line 86.

When an alarm is to be generated as when the REDIAL TIMER FUNCTION times out the three minute interval, the Microprocessor 80 generates an alarm signal which is placed on line 88 that is coupled to an Alarm Generator 90 and causes that generator 90 to generate an alarm clamp signal that is placed on line 92 and an audio alarm signal that is placed on a line 94 which together cause the Audio Monitor 56 to ignore any incoming audio signals and to supply an audio alarm to the speaker 23.

The Microprocessor 80 receives from the Status Sensor 64 a HOOK signal, "on hook" and "off hook", over a line 96 which signal indicates whether or not the telephone is on or off "hook". In response to this signal, the Microprocessor 80 generates a signal that is placed on a line 98 that flows to the Relays 70 to adjust the Line Control 54 to reflect the new status of the telephone receiver 12. These relays disconnect the Audio Monitor 56 whenever the telephone 12 is "off hook". Accordingly, the Relays 70 connect alternatively the Audio Monitor 56 and the telephone 12 to the incoming telephone lines 52 in accordance with the "on hook" and "off hook" status of the telephone 12. When no dialing is in progress and when the telephone 12 is "on hook", the Relays 70 cause the Line Control logic 54 to disconnect the telephone lines 52 entirely and send no sound signal to the Audio Monitor 56.

Associated with the Microprocessor 80 is a four to sixteen Decoder 100 that takes four data lines 102 from Microprocessor 80 and translates them into "element select signals" that are placed on lines 104 which flow both to a Keyboard circuit 110 and also to a fluorescent Display 120. The address lines 83 flow into the alternate coordinates of the Display 120 and thereby enable the Microprocessor 80 to drive all the selective elements of the Display 120 in a manner that will be described in more detail hereinafter. The Microprocessor 80 also scans four input lines 122 flowing back from the Keyboard circuit 100. By energizing alternate ones of the "element select signals" on lines 104 and by then scanning the four lines 122, the Microprocessor 80 may quickly determine the status of all of the keys in the Keyboard circuit 110 and take an appropriate action in response to and keystroke.

Power supplies 124 and 126 (FIGS. 9 and 10) supply the necessary voltages to operate all of the various elements of the repertory dialer 10. Included in the power supply 126 are rechargeable batteries 128 (FIG. 10) that maintain power for random access memories 130 and 132 within the Microprocessor 80 in case of a temporary power failure so that the numbers and names stored within these memories 130, 132 will not be lost due to a momentary power outage.

The logic modules or subcircuits 54, 56, 64, 60, 70, 80, 90, 100, 110, 120, 124 and 126 will now be described in detail in connection with the Fig. in which that subcircuit is shown in detail.

In FIG. 3 are set forth the details of the Line Control logic or circuit 54 and the Status Sensor 64. The Line Control circuit 54 occupies the upper half of the Fig. while the Status Sensor 64 is essentially the diamond-shaped network 133 at the bottom of the Fig. The relay switches shown in FIG. 3 are all shown in their normal rest position which they would occupy when the repertory dialer 10 is not actively dialing a number and also in case of a power failure. The incoming telephone line 52 is connected by these relays straight through to the telephone 12 so that the telephone 12 operates normally with this line, even in the event of a power failure.

The Status Sensor 64 includes the very low impedance network 133 which may be regarded as a short circuit insofar as its effect upon the telephone lines 52 or upon the telephone 12.

As shown, a relay switch 134 is driven by a RELAY 1 coil shown in FIG. 7.

Relay switches 136 and 138 are driven by RELAY 2 coil shown in FIG. 7.

Relay switch 142 is driven by RELAY 3 coil and relay switches 144 and 146 are driven by RELAY 4 coil. The set of switches 142, 144 and 146 are used to connect the incoming telephone line 52 alternately between the telephone 12 and the Audio Monitor circuit 56 and speaker 23. These relay switches are shown in their normal rest state such that the telephone 12 is connected to the line 52 and the Audio Monitor 56 has its input shorted by the switch 142 so that no sound comes from the speaker 23. In case of an incoming ring signal on the lines 52, that ring signal is conveyed directly to the telephone 12 and causes it to ring in a normal manner. If the telephone handset 20 is removed from its cradle 22 for any reason, current flow through the telephone 12 is then detected by the Status Sensor 64 which generates an "off hook" signal on output line 96 from Status Sensor 64.

If the dialer 10 is called upon to place a call, as when a name is searched for and the DIAL pushbutton is then depressed to initiate the dialing operation, or if one of the pushbuttons lettered "A", "B", etc. is depressed, or if the user actuates numeric keyboard 18 to produce direct dialing, the Microprocessor 80 immediately generates the necessary signals to disconnect the telephone 12 from the telephone lines 52 and to connect the Audio Monitor 56 to the telephone line 52 in place of actuation of the relay switches 142, 144 and 146. The telephone 12 is removed from connection with the line 52 by the contacts 34 and 36 and is shifted so that the telephone receiver 12 is connected between a positive potential at node 154 and ground potential 156 through a series resistor 158 such that current is maintained through the telephone 12 and through the Status Sensor 64 so that the Microprocessor 80 will be notified by the Status Sensor 64 if the handset 20 is removed from its cradle 22.

The Audio Monitor 56 has a low input impedance through a transformer 160 (FIG. 4) which, when attached to the incoming line 52 by the relay switch contact 142 permits current flow between the incoming lines 52 and therefor is sensed by the central office as an "off hook" condition. Accordingly, the central office responds with a dial tone which is amplified by the Audio Monitor 56 and presented to the speaker 23. Note that the telephone handset 20 does not have to be removed from its cradle 22 in order to initiate the call. After a suitable delay, the Microprocessor 80 actuates the relay switches 136 and 138 shown in FIG. 3 to cause the dialing of the number specified by the user.

If the system is set up for pulse dialing, then the pulse/tone relay switch contacts 40 and 42 are in the position shown in FIG. 3. The switch 40 shorts out a 4.7K resistor 162 and thereby connects the Audio Monitor 56 directly to the incoming lines 52. The switch 42 disconnects the Tone Dialer 60 from the telephone lines 52 and connects a node or contact 164 of the relay switch 136 to one side of the line 112. When dialing begins, the relay switches 136 and 138 driven by RELAY 2 coil (FIG. 7) shift their position so that a short circuit is established from a node 166 coupled to one telephone line 52 to a node 168 coupled to the other telephone line 52. With switch 134 of RELAY 1 in the position shown, a short circuit is established directly across incoming telephone lines 52. Actuation of the switch 134 by RELAY 1 then produces the dial pulse action necessary to send dial pulses to the central office. Capacitor 170 and resistor 172 connected serially across the switch contacts 134 are to suppress arcing and are required by telephone line international protocols.

After each set of dial pulses is transmitted by the switch contacts 134 to the telephone lines 52, the relay switch contacts 136 and 138 return to the state shown in FIG. 3 thereby leaving the Audio Monitor 56 connected across the line 52 again. Actuation of the relay switch 134 continues until all of the necessary dial pulses have been transmitted to the central office.

In the case of tone dialing, RELAY 1 switch 134 is not used and remains in the closed position indicated in FIG. 3. The pulse tone switch contacts 40 and 42 divert to the opposite states from those shown in the drawing and thereby couple a network of the resistor 162 and the capacitor 174 across the contacts of relay switch 136 as shown. Accordingly, actuation of RELAY 2 causes the switch contacts 136 to open the short circuit across this network and connect this resistor 174-capacitor 162 network in series with the Audio Monitor 56 to reduce the volume of the touch tone that is supplied to the speaker 23 during dialing. Touch tone dialing is accomplished by actuation of RELAY 2 which causes the switch contacts 136 and 138 to connect the Tone Dialer 60 to the incoming line 52, and by the Microprocessor 80 which programs the Tone Dialer 60 to generate the necessary tones. Each time the RELAY 2 is actuated, the light emitting diode 26 on the front panel 14 blinks to signal the transmission of another digit. The RELAY 2 actuates the switch contacts 136 and 138 with each digit that is transmitted.

After dialing, the relay switch contacts 144 and 146 remain in a state opposite to the state shown in FIG. 3 so that the telephone 12 remains disconnected from the telephone line 52 and connected between the positive supply node 154 and ground 150 through the Status Sensor 64. Telephone line 52 remains connected by the relay switch 142 of RELAY 3 to the Audio Monitor 56 so that the dialing signals and the voice of the answering party can be heard through the speaker 23. There is no need for the handset 20 to be lifted from its cradle 22 while the call is being placed until the called party answers. At that point in time, the handset 20 is lifted from its cradle 22. The Status Sensor 64 detects this handset 20 removal and generates the "off hook" signal at output line 96 and supplies this signal to the Microprocessor 80.

In response, the Microprocessor 80 deactivates RELAY 4 returning the switch contacts 144 and 146 thereof to the state shown in FIG. 3, and a short time delay later, deactivates RELAY 3 to return switch contacts 142 to the slots shown in FIG. 3 to disconnect the Audio Monitor 56 from the incoming line 52.

The telephone conversation then proceeds to termination, at which point the caller returns the handset 20 to its cradle 22. The Status Sensor 64 senses this action and terminates the output signal at output line 152. The Microprocessor 80 leaves the RELAYS 1–4 in the state shown in FIG. 3 so that the telephone 12 remains connected directly to the line 52 until the repertory dialer 10 is called upon to place another call.

During touch tone operation, the touch Tone Dialer 60 is connected directly to the telephone line 52 through the relay switch contacts 136 and 138 by means of a diode bridge 176 which ensures that the polarity of the telephone line 52 is adjusted to match that of the Tone Dialer 60.

As shown, the Status Sensor 64 includes a light emitting diode 182 that is energized whenever current flows through the telephone 12. Telephones are designed such that when the handset 20 is removed from its cradle 22, the direct current is permitted to flow through the telephone 12 as a signal to the central office. This current flow passes through a diode bridge of the network 133 which includes four diodes 184, 186, 188 and 190 and thereby is rectified for passage through the light emitting diode 182 within the Status Sensor 64. Light from the diode 182 falls upon the base of a light sensing transistor 192 which supplies current to an inverting transistor amplifier 194 that then generates the "off hook" signal at the output line 152. A transistor circuit 195 associated with the light emitting diode 182 is a current limiting curcuit designed to bypass heavy current through a transistor 196 that might otherwise cause damage to the diode 182 or insert too large an impedance into the telephone lines 52.

When the relay switch contacts 144 and 146 switch the telephone 12 from connection between the positive node 154 and ground 156 over to connection with the telephone lines 52, there is a momentary period during which the relay switch contacts 144 and 146 are in mid-swing, with the telephone 12 not connected to any particular source of current. During this brief interval, the Status Sensor 64 might give forth a false indication that the telephone handset 20 is "on-hook", since there is no current flow. To prevent this from happening, and with reference to FIG. 7, a signal R on line 198 which actuates RELAYS 3 and 4 thereby to operate switch contacts 144 and 146 associated with RELAY 4 is also passed through a capacitor 200 to form a pulse which is amplified by a transistor 202 and applied via signal ine 204 as an R pulse to the base of the light sensing transistor 192. This R pulse is generated every time the relay switches 144 and 146 are operated and serves to prevent the stopping of current flow through transistor 192 due to a momentary halt in the current flow through the telephone 12 as the relay contacts 144 and 146 are in mid-swing.

Capacitor 208 in series with transistor 192 and capacitor 210 coupled to the base of transistor 196 also serve to prevent momentary cessations of this current flow to prevent misleading the Microprocessor 80 into believing that the telephone handset 20 has been momentarily returned to its cradle 22.

FIG. 4 is shown a schematic circuit diagram of the Audio Monitor 56 which is conventional audio amplifier circuit that accepts an input signal at audio inputs X and Y connected to primary winding 212 of transformer 160 and drives the speaker 23 at its output. The circuit includes volume control 48 for adjusting its sensitivity. Further, the Audio Monitor 56 includes a transformer secondary winding 214 coupled through a filter network 218 to a first amplifier state 220. This state 220 is then coupled to a power output amplifier stage 222 which in turn is coupled by means of a transformer 224 to the speaker 23.

When an alarm signal is to be given off, an alarm clamp signal is placed on line 92 and clamps the input to the intermedial amplifier 220 and thereby blocks the audio from the telephone lines 52 from passing through the amplifier 220. Simultaneously, an audio alarm signal is applied via line 94 directly to the output of the power amplifier 222 so that an audio alarm signal is applied to the speaker 23.

To produce audible sounds when dialing is in progress, a signal Q applied to a line 230 is amplified by an amplifier 232 and, as amplified, applied to input 234 of the intermediate amplifier 220 in synchronism with the generation of dial pulses. As shown in FIG. 8, the signal Q is generated by the Microprocessor 80 and is one of the signals fed via line 230 to the RELAYS 70 shown in FIG. 7 each time a dial pulse character is generated by the repertory dialer 10. Accordingly, a gentle clicking sound is heard in the speaker 23 as each individual digit is dialed either with pulses or with tones.

In FIG. 5 is shown the schematic circuit for the Alarm Generator 90. In response to a positive level alarm signal applied on line 88, the Alarm Generator 90 generates an audio clamp signal on line 92 that adjusts the Audio Monitor 56 (FIG. 4) to block the transmission of audio, and simultaneously generates an audio output signal on line 94 that is applied to the speaker 23 by the Audio Monitor 56 (FIG. 4). The Alarm Generator 90 includes two multivibrator stages 400 and 500. These stages are conventional two transistor, capacitor feedback multivibratory which are free funning. The multivibrator 400 has a slow frequency, and the multivibrator 500 has a high frequency that is in the audio range. Accordingly, the multivibrator 400, through a diode 520, turns the multivibrator 500 on and off periodically and thereby generates audio pulses which are supplied to the speaker 23, whenever the signal on line 88 is positive to permit the multivibrator 400 to operate. An input circuit 530 which receives the signal on line 88 is arranged such that a pulse input produces at least one tone pulse output, so that a single pulse from the Microprocessor 80 produces a tone of longer duration. These tones are also generated by the Microprocessor 80 each time one of the keys on the front panel 14 is depressed to confirm that the key has actually been depressed far enough.

Referring to FIG. 6, there is illustrated therein the electrical circuit for the Tone Dialer 60. This Tone Dialer 60 includes an eight bit latch 602 into which are fed eight address leads from the address bus 83 coupled to the Microprocessor 80. The eight output leads 606 from this latch are fed into an integrated circuit Tone Generator 608 the output 610 of which has a pair of mixed audio tones suitable for tone dialing. The output at 610 is applied to an amplifying transistor 612 and then is applied directly to the signal lines A and B which are coupled to the diode network 176 (FIG. 3) for supplying tone signals to the telephone lines 52 when tone dialing is in effect. The Tone Generator 608 generates a tone in response to a ground level signal at input terminal 620 thereof. This ground level signal flows from a transistor 622 having its base coupled to the TONE input signal line 86 which is supplied with a TONE signal by the Microprocessor 80. When the collector 626 of the transistor 622 goes neative in response to the TONE signal, a capacitor 628 generates a momentary pulse to the base of a transistor 630 which feeds a gate input 632 of the latch 602 thereby to cause the contents of the eight Microprocessor 80 address lines 83 to be read and stored within the latch 602.

The latch 602 can be, for example, a Texas Instruments integrated circuit Serial Number 7475. The Tone Generator 608 used in a preferred embodiment is an American Microsystems, Inc. integrated circuit Number S2559V.

The schematic circuit for the RELAYS 70 is shown in FIG. 7. As shown, the signals P, Q and R are applied over signal lines 706, 230 and 198 to the inputs of Darlington pair transistor amplifiers 718, 720, 722, and 724 and from thence to the coils of RELAYS 1, 2, 3 and 4, which actuate the relay switches 134, 136, 138, 142, 144 and 146 shown in FIG. 3. Diodes 726, 728, 730 and 732 are connected across the relay coils to suppress arcing and to protect the integrated circuits.

The light emitting diode 26 (FIG. 1) is connected in series with a 300 ohm resistor 734 from $V_T$ through the diode disable switch 38 to a pair of diodes 736 and 738 which are coupled to the coils of RELAYS 1 and 2. RELAY 1 is the pulse dialing relay, and accordingly, the diode 26 lights up each time a dial pulse is generated. When the pulse/tone switch 44 which is operated in a gang with switches 40 and 42 shown in FIG. 3 is closed and tone dialing is in effect, then the diode 26 lights up each time a tone digit is generated under the control of RELAY 2.

In a preferred embodiment, RELAY 1 is a Fujitsu reed relay of the normally closed type, model number 648D05/IBS. RELAYS 2 and 4 are Fujitsu relays model number FBR22IND006 and RELAY 3 is a Fujitsu relay model FBR211AD005.

The light emitting diode is manufactured in accordance with specification MIL-31 by Microelectronics. The Darlington Pair transistor amplifiers 718, 720 and 722 are also manufactured by Microelectronics, model number MPSA13.

It is to be noted that the Darlington Pair transistor amplifier 724 includes a resistor 750 and a capacitor 752 connecting the first transistor 754 in the pair to the second transistor 756. The purpose of this resistor 750-capacitor 752 pair is to delay the actuation of RELAY 3 for a short time after RELAY 4 is actuated. Previously, in connection with the description of FIG. 3, it was explained that this was necessary to avoid a momentary "on hook" condition from being signaled on the telephone lines 52 when the RELAYS 70 shifted from a coupling of the Audio Monitor 56 to the telephone lines 52 to direct connection of the telephone lines 52 to the telephone 12 and shorting of the input to the Audio Monitor 56.

A block circuit diagram of the Microprocessor 80 illustrating the logic which controls the repertory dialer 10 is shown in FIG. 8. The Microprocessor 80 is of the type manufactured by Mostek under model number MK 3870. It contains a read only memory (not shown) in which the program logic can be stored that controls the dialer 10. The details of the program logic are described hereinafter in connection with the description of FIGS. 11-14.

As shown, the address bus 104 connects the Microprocessor 80 to the first and second random access memories 130 and 132. Also, one lead 802 of the address bus 104 is connected to the "right enable" terminals of the random access memories 130, 132 and connects that terminal to output pin 34 of the Microprocessor 80, which pin 34 thereby controls what is read into or written out of the random access memories 130 and 132. The chip selection as to which random access memory 130 or 132 is addressed, is determined by signals at pins 9 and 14 from the Microprocessor 80 which are applied to "CS" (chip select signal) inputs to the two random access memories 130, 132. The logic 804 that connects to the "CS" terminals will be described further below.

The Microprocessor 80 is thus able to present an address to the random access memories 130, 132, select one or the other of them, generate a "right enable" signal which determines whether data is written into or written out of the memory, and then either sends data over the data bus 102 or receives data back over the bus 102, to or from the RAM's 130, 132.

The data bus 102 is also present to the four to sixteen decoder 100 having sixteen output lines, only one of which is energized in response to the particular bit combination presented on the four data lines 102. This one of sixteen signal selection generates signals that are used to drive both the keyboard circuit 110 and also the fluorescent display 120. The sixteen leads are fed into the keyboard circuit logic 110 and energizes of the keyboards into sixteen different groups. Whenever a keyboard is actuated, it connects one of these sixteen lines to one of four output lines that feed back to the microprocessor over the bus 122. Accordingly, by generating data on the data lines 102 and by then scanning the four lines 122, Microprocessor 80 can determine which, if any, of the keys, or pushbuttons, have been actuated. The lead in bus 122 connecting to terminal 29 of the Microprocessor 80 has a diode in it, as shown.

The keyboard circuit 110 is of conventional design and was designed to have a key or pushbutton arrangement labelled as shown in FIG. 1.

A crystal 814 is connected between terminals 1 and 2 of the Microprocessor 80 and is coupled to three capacitors as shown to form a master clock for the entire system. The crystal 814 is of the type supplied by International Piezo Ltd. and has a crystal frequency of 3.579973 megacycles.

The sixteen leads of the "element select signal" bus 104 are also supplied to a display cathode driver unit 820. Simultaneously, the fourteen address output leads 82 from the Microprocessor 80 are supplied to display anode driver unit 822. The sixteen display cathode drivers in the unit 820, each of which is identical to the circuit shown in the schematic block, drive the grids of fluorescent display tubes in the Alphanumeric sixteen character fluorescent display 120. All of the grids for a given character are connected in parallel to a single lead and each of the leads goes to a separate driver within the unit 820 which is driven by a separate one of the element select signal lines 104. The anodes of the fluorescent display 120 are connected such that the corresponding segment in each display is connected to that same segment in all of the other displays. Since each unit has fourteen elements, fourteen anode leads are connected to the display anode drivers of unit 822, each of which appears as the circuit shown in the schematic block. The fourteen anodes are then driven by the fourteen address leads 83 from the Microprocessor 80. In this way, the Microprocessor 80, by supplying an element select signal and by then supplying anode driver signals, can energize any element in any one of the Alphanumeric fluorescent display units in the display 120. Accordingly, Microprocessor 80 can periodically update and rive the display 120. Depending how frequently the display 120 is driven, the brightness of the display can also be varied by the Microprocessor 80.

The remaining connections to the Microprocessor 80 are simply single leads that either emanate from the Microprocessor 80, as in the case of the relay driving signals on lines 98 (P, Q, R) or flow into the Microprocessor 80, as in the case of an "off hook" signal which flows from the Status Sensor 64 in FIG. 3 over the lead 96 to input 25 of the Microprocessor 80.

In FIG. 9 is shown the main power supply 124 for the dialer 10. This power supply 124 is conventional and supplies all the necessary voltages for operating all the different elements of the system. Element voltage for the fluorescent display tues is provided on lines 902 and 904 from a secondary winding 906 on a main power transformer 908. Primary DC power, unregulated, $V_u$, appears on output line 910 and is used to power the Audio Monitor 56 and other devices not requiring careful regulation. A Zener diode 914 provides a 6.2 volt reference to the base of a regulating power transistor 918, the emitter of which at 920 supplies the requlated voltage V+ on output line 922 which powers all of the logic circuits. To provide a slightly lower voltage for the anodes of the display devices, a pair of diodes 930 and 932 are connected serially between V+ output line 922 and a $V_D$ output line 940 which power the anodes of the fluorescent display devices in the display 120 (FIG. 8). Filtered voltages $V_A$ and $V_B$ provided on output lines 950 and 960 for the Audio Monitor 56 and for the Alarm Generator 90, since these subcircuits handle low level signals and therefore need conventional RC isolation filters to be interposed between their voltage supplies and the main power supply. A voltage drawn directly from the Zener diode 907 and call $V_{reg}$ is supplied on output line 970 for use by the separate power supply 126 (FIG. 10) that is provided for the random access memories 130 and 132.

Referring now to FIG. 10 there is illustrated therein the separate memory power supply 126 which is driven by $V_u$, the unregulated voltage on output line 910 in FIG. 9. The reference voltage $V_{reg}$ from line 970 is fed into a regulating transistor 1010 which provides at its emitter 1014 the voltage $V_{RAM}$ which powers the RAM's 130 and 132 shown in FIG. 8. A diode 1016 and a resistor 1018 trickle charge a set of a rechargeable batteries 1020 thereby to provide a backup source of power to keep the memories 130 and 132 supplied with power during a momentary power failure. The battery switch 52 allows one to disconnect the backup battery 1020 when desired. A diode 1032 connects the batteries 1020 to the output $V_{RAM}$. Because the battery 1020 is of a lower voltage than the voltage provided at the emitter 1014, normally no current is drawn from the battery 1020. But, in the case of a power failure, the diode 1032 becomes conductive and the RAM's 130 and 132 then draw power directly from the battery 1020.

When a power failure occurs, the voltage V+ generated on output line 92 (FIG. 9) drops to a lower level than the voltage $V_{RAM}$ supplied at emitter 1014 (FIG. 10) and is stabilized by the batteries 1020. This drop in the level of voltage V+ is detected by logic circuit 804 shown in the center of FIG. 8 which clamps the "CS" terminals of the two random access memories 130 and 132 high so that, in effect, neither chip is selected and the Microprocessor 80 and its circuitry is prevented from doing anything to disturb the memory contents of the chips for the duration of the power failure.

An overview of the program system will now be described with reference to the flow charts shown in FIGS. 11–14.

The functions carried out by the programming system have already been described in overview in connection with the general description of how the dialer 10 operates and the various events which occur in connection with automatic dialing.

The description below focuses upon the routines illustrated in FIGS. 11 through 14. Sbusequently, the actual subroutines that constitute the elements of this program system are set forth in detail. Accordingly, the names or titles which appear in quotation marks in FIGS. 11 through 14 are the actual names of programs that are called upon to carry out the corresponding functions and that are described hereinafter in more detail.

Referring now to FIG. 11, program execution is initiated when the Microprocessor 80 is powered up. The Microprocessor 80 is designed internally to execute a power up routine 1110 when it first comes into operation. This routine does the necessary house cleaning to put the dialer 10 into condition to begin service. Program flow then commences with a common termination point routine 1120 which is the point at which all routines terminate and at which the dialer 10 cleans up whatever is needed before beginning a new cycle. Program flow then commences with the main program "MP" 1130.

Program control then commences down the routine shown in FIG. 11 where a variety of flags are checked to see what is going on. If dialing is found to be in progress at step 1140, then a check is made at step 1150 to see if the phone is on or off hook and appropriate actuation of the RELAYS 3 and 4 in FIG. 7 and of their corresponding relay switch contacts in FIG. 3 is made to shift the Audio Monitor 56 off the telephone line 52 and the telephone 12 onto the telephone line 52. If the timer is sensed to be operating and is being displayed at step 1160, then the display of elapsed time is updated at step 1170. If the clock is found to be operating at step 1180, then the display of the clock time is updated at step 1190. If the redial timer is found to have timed out at step 1192, then the alarm is sounded at step 1194.

If none of the above things has happened, then the system proceeds to check to see if any keys have been actuated at step 1196. If so, the appropriate key service routine is called up at step 1200. Then program control returns to the common termination point at 1120 and from thence back to the main program at 1130. The details of these routines are described in the listing set forth below.

A subroutine called KEYSUB has as its entry point the step 1196 where the question is asked if a Key has been actuated. This subroutine is part of a number of routines within the programming system, as will be explained below.

In FIG. 12 there is set forth a block diagram of the Key Service Routines. A separate routine is provided for each possible keystroke that might have occurred. If the NAME key was struck, then the NAME routine is executed at step 1203 (this routine appears in FIG. 13).

If an alarm interrupt was set during the interrupt signal processing (see FIG. 14), an ALARM key service routine is executed at step 1210.

If the Clock key has been struck, then the CLOCK SET AND DISPLAY routine is executed at step 1220.

If an Alphabetic Key has been struck, then one of the ALPHABETIC keystroke service routines is executed at step 1230.

If a Numeric key has been struck, then the NUMERIC keystroke service routine is executed at step 1240.

If the Dial key or button has been struck, then the DIAL/REDIAL service routine is executed at step 1250.

If the Reset key has been struck, then the subroutine that resets the telephone 12 is executed at step 1260.

If the Redial Timer key has been struck, then the subroutine that activates the redial timer is serviced at step 1270.

If the Store key has been struck, then the store flag is set at step 1280.

If the Elapsed Timer key is struck, then the routine that services the timer is executed at step 1290.

All of these routines return to the common termination point routine at Step 1120 in FIG. 11.

Note that the three subroutines 1230, 1240 and 1250 all have tests or ask questions at the steps 1292, 1294 and 1296 respectively after they terminate to see if the KEYSUB subroutine call is in effect, as is indicated by a flag. If so, the routines at steps 1292, 1294 and 1296 execute a subroutine return to whatever program is calling. Accordingly, any routine within the system that requires a keystroke retrieval can call the subroutine KEYSUB. Then, if either an Alphabetic keystroke, a Numeric keystroke or the Dial key are struck, that information is passed back to the calling routine and processed appropriately. If any other key is struck, the system returns to the common termination point routine 1120 and proceeds on as if no routine had ever been called and the subroutine KEYSUB had never been called. Accordingly, in the middle of an operation, one may strike any key and initiate some other operation.

The flow diagram or chart for the NAME routine is shown in FIG. 13. This routine begins at step or subroutine 1302 with a call to the KEYSUB subroutine depicted as going to step 1304 in FIG. 13 to a accept a name or command. The subroutine 1302 also displays an appropriate message on the fluorescent display 120. Upon return from a subroutine, a test is executed or question asked at step 1305 to see whether a name or command was entered. If a name, another test or question is ececuted at step 1306 to determine whether the store flag is set, due to striking of the Store key before the Name key was struck. If the store flag is set, then the subroutine NSTORE is executed at step 1308 to store away the information provided, and program control returns to the common termination point routine 1120. If the store flag was not set, then this is a search for a name and the Search subroutine proceeds at step 1310. If a match is found at step 1312, the routine LONAME is executed at step 1314 which causes the name found to be displayed.

Then, a second level output/input monitor routine called NKEY is executed at step 1316 and supplies another call to the subroutine KEYSUB at step 1317 to request what action to be taken next. If the Search key is struck at step 1318, a routine called SRNEW is initiated at step 1320 to reinitiate the name search at the point where it left off, after which the SEARCH subroutine at step 1210 is re-executed again.

If the List key is struck at step 1322, the program continues with the execution of the LIST function at step 1324, as will be described below.

If the Delete key was struck and sensed at step 1326, the program goes to step 1328 where NDEL is executed, which deletes the current name record from the memory after which the program control returns to the common termination routine 1120 in FIG. 11.

If the Dial key was struck and sensed at step 1330, then the program executes the subroutine NTELE at step 1332 which dials the telephone number, after which program control returns to the common termination point routine 1120.

If it is found at step 1305 that a name was not entered, then a test is made or a question is asked at step 1334 to see if the Delete key was struck. If so, then the subroutine MDEL is executed at step 1336 to clear the name memory of all its contents. This routine includes a call to the KEYSUB routine shown as step 1338 to verify that the user actually wants the memory cleared by means of actuating the List pushbutton. If the Delete key was not struck at step 1334, then the List function is initiated at step 1324. At the end of the List function, the program returns to the common termination point routine 1120. If the end of the list has not been reached at the time step 1340 is reached, the name found is displayed by the program LONAME at step 1314.

In FIG. 14 is illustrated a block flow diagram of the interrupt processing routine which is triggered into execution periodically by interrupts generated by the system clock. The Microprocessor 80 includes internal counters which cause interrupts not to occur every time the clock cycles but at periodic intervals, that are spaced out, depending upon the contents of a certain register within the Microprocessor 80 that is loaded with information by the software system. At the start of each interrupt interval, the registers are saved at step 1402. Then, if dialing is in progress at step 1404, a check is made at step 1406 to see if there is a time for a state change in dialing process and if so, then the switch hook or tone generator logic is adjusted at step 1408.

In either event, the dialing counters are adjusted at step 1410. Then that data is transferred from a display buffer to the fluorescent display 120 at step 1412.

The delay counter routine is serviced at step 1414. Then, contact debouncing and updating of the internal image of the external contacts is carried out at step 1416. Thus, the scanning of the external contacts is carried out during the interrupt and other program routines merely check an image of the external contacts.

At step 1418, the real time counters, including the clock, the timer and the redial timer are all adjusted.

At step 1420, the alarm flag is set if necessary. Then, if step 1422, the registers are restored and a return is executed to whatever program is interrupted by the interrupt request so that nothing is disturbed.

PROGRAM LISTINGS

What follows is a complete listing of the computer program that was used in constructing the preferred embodiment of the invention. To improve its readability, the order of the routines and subroutines has been altered, and a small number of non-substantive changes in the branching instructions have been made. For example, where two routines shared several lines of code in the actual program, and where such sharing rendered one of the routines difficult to follow, the code has been duplicated in both routines and the instruction branching program control from one routine to the other has been eliminated. The entire listing has been retyped, and some typographic errors may appear, but it will be obvious to anyone skilled in programming how such errors are to be corrected. All the comments and documentation have been preserved and, in some instances, expanded.

The microprocessor used was a MOSTEK MK 3870 F8 microprocessor, and the program listing is written out in the F8 instruction set. A complete explanation of the F8 language may be obtained from MOSTEK in the form of published specification sheets for the MK 3870 and other F8 microprocessors. The following brief summary of the F8 instruction set will enable engineers and programmers who are not familiar with the F8 language to read and understand the program listing.

| | Accumulator | | Branching |
|---|---|---|---|
| LNK | Add carry | BC | Branch on carry |
| AI | Add immediate | BP | Branch on positive |
| NI | And immediate | BZ | Branch on zero |
| CLR | Clear | BT | Branch on true |
| CI | Compare immediate | BM | Branch if negative |
| COM | Complement | BNC | Branch if no carry |
| XI | Exclusive or immediate | BNO | Branch if no overflow |
| | | BNZ | Branch if not zero |
| INC | Increment | BF | Branch if false |
| LI | Load immediately | BR7 | Branch if ISAR (lower) |
| LIS | Load immediate short | BR | Branch relative |
| OI | Or immediate | JMP | Jump |
| SL | Shift left | | |
| SR | Shift right | | |
| | Memory Reference | | Address Register |
| AM | Add Binary | ADC | Add to data counter |
| AMD | Add Decimal | PK | Call to subroutine |
| NM | And | PI | Call to subroutine immediate |
| CM | Compare | | |
| XM | Exclusive Or | XDC | Exchange DC |
| LM | Loan | LR | Load Data Counter |
| OM | Logical or | DCI | Load DC Immediate |
| ST | Store | LR | Load Program Counter or stack counter |
| | | POP | Return from subroutine |
| | | LR | Store Data or stack Counter |
| | Scratchpad | | Miscellany |
| AS | Add Binary | EI | Enable Interrupt |
| ASD | Add Decimal | DI | Disable Interrupt |
| DS | Decrement | IN | Input |
| LR | Load | INS | Input Short |
| NS | And | LR | Load/store V ISAR or Status Register |
| XS | Exclusive or | | |
| | | LISL | Load ISAR Lower |
| | | LISU | Load ISAR Upper |
| | | LR | Loan Status Register |
| | | NOP | No Operation |

-continued

| | | |
|---|---|---|
| OUT | Output | |
| OUTS | Output Short | |

A. CONSTANTS

These constants are assigned the symbolic names indicated, and the symbolic names are used throughout the program listings that follow.

| | NUMERIC CHARACTERS | | |
|---|---|---|---|
| N1 | EQU | H'01' | |
| N2 | EQU | H'02' | |
| N3 | EQU | H'03' | |
| N4 | EQU | H'04' | |
| N5 | EQU | H'05' | |
| N6 | EQU | H'06' | |
| N7 | EQU | H'07' | |
| N8 | EQU | H'08' | |
| N9 | EQU | H'09' | |
| N0 | EQU | H'0A' | |
| | SPECIAL CHARACTERS | | |
| BO | EQU | H'0B' | < Open Bracket |
| BC | EQU | H'0C' | > Close Bracket |
| SL | EQU | H'0D' | / Slash |
| FST | EQU | H'0E' | . Full Stop |
| COM | EQU | H'0F' | , Comma |
| SP | EQU | H'2D' | Space |
| | ALPHABETIC CHARACTERS | | |
| A | EQU | H'11' | |
| B | EQU | H'12' | |
| C | EQU | H'13' | |
| TD | EQU | H'14' | |
| E | EQU | H'15' | |
| F | EQU | H'16' | |
| G | EQU | H'17' | |
| H | EQU | H'18' | |
| TI | EQU | H'19' | |
| J | EQU | H'1A' | |
| K | EQU | H'1B' | |
| L | EQU | H'1C' | |
| M | EQU | H'1D' | |
| N | EQU | H'1E' | |
| O | EQU | H'21' | |
| P | EQU | H'22' | |
| Q | EQU | H'23' | |
| R | EQU | H'24' | |
| TS | EQU | H'25' | |
| T | EQU | H'26' | |
| U | EQU | H'27' | |
| V | EQU | H'28' | |
| W | EQU | H'29' | |
| X | EQU | H'2A' | |
| Y | EQU | H'2B' | |
| Z | EQU | H'2C' | |
| | SUBMODE KEY | | |
| SRCH | EQU | H'0B' | |
| ENTER | EQU | H'0C' | |
| YES | EQU | H'0D' | |
| DEL | EQU | H'0E' | |
| | CONTROL KEY | | |
| KLIST | EQU | H'0D' | |
| KDIAL | EQU | H'3A' | |
| KOFFLN | EQU | H'38' | |
| KSTORE | EQU | H'3B' | |
| KCLK | EQU | H'3C' | |
| CTIMER | EQU | H'3E' | |
| KNAME | EQU | H'39' | |
| KTSTS | EQU | H'37' | |
| KREDL | EQU | H'3D' | |

B. PREDEFINED VALUES

The following predefined values are loaded into high core and are addressed by the symbolic names indicated. These include all the messages to be displayed, the key service branch table BSADR, the codes needed to energize the display drivers, and the touch tone frequency codes.

| | NO. PLS | | | |
|---|---|---|---|---|
| NUADR | DC | N,O,FST,SP,P,L,TS,H'00' | | |
| | NO. STORED | | | |
| NSADR | DC | N,O,FST,SP,TS,T,O,R,E,TD,H'00' | | |
| | NO SUCH | | | |
| CFADR | DC | SP,SP,N,O,SP,TS,U,C,H,SP | | |
| | NAME PLS | | | |
| NMADR | DC | N,A,M,E,SP,SP,P,L,TS,H'00' | | |
| | FULL | | | |
| MFADR | DC | F,U,L,L,H'00' | | |
| | ERASE MEMORY, Y/N | | | |
| EMADR | DC | E,R,A,TS,E,SP | | |
| | DC | M,E,M,O,R,Y,COM,Y,SL,N | | |
| | BMBBB.FF | | | |
| CKADR | DC | SP,M,SP,SP,SP,FST | | |
| | DC | SP,SP,FST,H'00' | | |
| | TIMER ON | | | |
| RTADR | DC | T,TI,M,E,R,SP,O,N,FST,H'00' | | |
| | REDIAL PLS | | | |
| TRADR | DC | R,E,TD,TI,A,L,SP,P,L,TS,H'00' | | |
| | WRONG KEY | | | |
| ILADR | DC | W,R,O,N,G,SP,K,E,Y,H'00' | | |
| | MEMORY EMPTY | | | |
| MEADR | DC | M,E,M,O,R,Y,SP,E,M,P,T,Y,H'00' | | |
| | NO. | | | |
| NDADR | DC | N,O,FST,SP | | |
| | DELETED | | | |
| ERADR | DC | TD,E,L,E,T,E,TD,H'00' | | |
| | ALARM | | | |
| ALADR | DC | A,L,A,R,M,SP | | |
| | TIME PLS | | | |
| CPADR | DC | T,TI,M,E,SP,P,L,TS,H'00' | | |
| | OFF | | | |
| OFADR | DC | O,F,F,H'00' | | |
| | BRANCH TABLE | | | |
| BSADR | DA | RESET | | |
| | DA | NAME | | |
| | DA | REDIAL | | |
| | DA | STORE | | |
| | DA | CLKKEY | | |
| | DA | RETKEY | | |
| | DA | TIMKEY | | |
| | DISPLAY CODES | | | |
| DSPADR | DA | H'0003' | 1 | 01 |
| | DA | H'DB00' | 2 | 02 |
| | DA | H'CF00' | 3 | 03 |
| | DA | H'E600' | 4 | 04 |
| | DA | H'ED00' | 5 | 05 |
| | DA | H'FD00' | 6 | 06 |
| | DA | H'0700' | 7 | 07 |
| | DA | H'FF00' | 8 | 08 |
| | DA | H'EF00' | 9 | 09 |
| | DA | H'3F00' | 0 | 0A |
| | DA | H'C000' | - | 0B |
| | DA | H'0014' | > | 0C |
| | DA | H'0018' | / | 0D |
| | DA | H'0002' | FST | 0E |
| | DA | H'0010' | COM | 0F |
| | DA | H'0000' | | 10 |
| | DA | H'F700' | A | 11 |
| | DA | H'8F03' | B | 12 |
| | DA | H'3900' | C | 13 |
| | DA | H'0F03' | D | 14 |
| | DA | H'F900' | E | 15 |
| | DA | H'F100' | F | 16 |
| | DA | H'BD00' | G | 17 |
| | DA | H'F600' | H | 18 |
| | DA | H'0903' | I | 19 |
| | DA | H'1E00' | J | 1A |
| | DA | H'7028' | K | 1B |
| | DA | H'3800' | L | 1C |
| | DA | H'360C' | M | 1D |
| | DA | H'3624' | N | 1E |
| | DA | H'0000' | 1F | |
| | DA | H'0000' | 20 | |
| | DA | H'3F00' | O | 21 |
| | DA | H'F300' | P | 22 |
| | DA | H'3F20' | Q | 23 |
| | DA | H'F320' | R | 24 |
| | DA | H'ED00' | S | 25 |
| | DA | H'0103' | T | 26 |
| | DA | H'3E00' | U | 27 |
| | DA | H'3018' | V | 28 |
| | DA | H'3630' | W | 29 |
| | DA | H'003C' | X | 2A |
| | DA | H'000E' | Y | 2B |
| | DA | H'0918' | Z | 2C |
| | DA | H'0000' | BLANK | 2D |
| DIGIT ORDER: MSB R4 R3 R2 R1 C4 C3 C2 C1 LS | | | | |
| TONCOD | DC | H'EE' | DIGIT 1: 1110,1110 | |
| | DC | H'ED' | DIGIT 2: 1110,1101 | |
| | DC | H'EB' | DIGIT 3: 1110,1011 | |
| | DC | H'DE' | DIGIT 4: 1101,1110 | |
| | DC | H'DD' | DIGIT 5: 1101,1101 | |
| | DC | H'DB' | DIGIT 6: 1101,1011 | |
| | DC | H'BE' | DIGIT 7: 1011,1110 | |
| | DC | D'BD' | DIGIT 8: 1011,1101 | |
| | DC | H'BB' | DIGIT 9: 1011,1011 | |
| | DC | H'7D' | DIGIT 0: 0111,1101 | |

C. MAIN PROGRAM

The following main program runs continuously and cyclically, from MP down to three lines past KEYSCN, where it branches back to MP. First, it checks for on-hook and off-hook conditions. Then, at TIMDSP it checks to see if the internal timer is to be displayed and displays the timer if necessary. At CLKDSP it checks to see if the clock is to be displayed and does so if necessary. Next, a TIMORT, it checks the redial counter and beeps if it is time to redial. And, finally, at KEYSCN, it checks to see if any key has been actuated. If not, then program control branches back to MP. Otherwise the final portion of the main program branches to the appropriate key service routine (see Section D. which follows). If a numeric or alphabetic key was struck, program control is transferred to the routines NUMKEY or ALPKEY. Otherwise, the number corresponding to the key struck is converted into the address of the appropriate one of the routines RESET, NAME, REDIAL, STORE, CLKKEY, RETKEY or TIMKEY who addresses are listed at BASADR in the predefined values section of the program (see the program set forth in Section B).

After the key service routine has run to completion, program control returns to the common termination point for the main program (Section F0 and ultimately jumps back to MP at the start of the main program.

The NAME key service subroutines are set forth in Section F.

| | SWITCH ROUTINE TO CONTROL RELAY 3 AND THE AUDIO MONITOR ACCORDING TO THE STATE OF THE HAND SET | | |
|---|---|---|---|
| MP | EI | | |
| | LISU | 4 | |
| | LISL | 7 | |
| | LIS | 4 | |
| | NS | 4 | TEST DIAL FLAG |
| | BZ | SW0 | |
| SW9 | INS | 4 | |
| | NI | H'20' | |
| | BZ | SW0 | BR ON RELAY 1 A |
| | LIS | 2 | |
| | LR | 8,A | |
| | XS | 2 | |
| | LR | 2,A | |
| SWLOP | LIS | 2 | |

| | | | | | | | | |
|---|---|---|---|---|---|---|---|---|
| | NS | 2 | | | | LISU | 3 | |
| | BNZ | SWLOP | | | | LISL | 6 | PT COUNTER |
| | DI | | | | | LI | H'F0' | |
| | OUTS | 1 | | | | LR | S,A | |
| | INS | 4 | | | | INS | 4 | |
| | NI | H'20' | | | | NI | H'FB' | |
| | BZ | SW0 | BR ON RELAY 1 A | | | OUTS | 4 | |
| | | | | | | LOAD CLOCK REQ. | | |
| RELAY 1 B | | | | | LOCE | DCI | CKADR | BMBBB.BB.BB. to DSP |
| | INS | 1 | | | | PI | LOTEXT | |
| | BP | SW1 | BR ON HAND SET ON HOOK | | | DI | | |
| | | | | | | LISU | 3 | |
| | HAND SET LIFTED | | | | | LISL | 4 | PT ALM PM/ FLAG |
| | LR | A,4 | | | | | | |
| | OI | H'80' | SET LIFT FLAG | | | AS | S | |
| | LR | 4,A | | | | BZ | LOCL | BR ON ALARM OFF |
| | INS | 4 | | | | | | |
| | OI | H'80' | RELAY 3 B | | | LISU | 6 | |
| | BR | SW6 | | | | LISL | 2 | |
| | HAND SET NOT LIFTED | | | | | LI | A | |
| SW1 | INS | 4 | | | | LR | D,A | |
| | BP | SW3 | BR ON RELAY 3 A | | | LI | L | |
| | | | | | | LR | D,A | |
| | RELAY 3 B | | ACC: 1XXX,XXXX | | | INC | | |
| | NS | 4 | | | LOCL | LR | S,A | |
| | | | | | | LISU | 4 | |
| | BP | SW7 | BR ON LIFT=0 | | | LR | A,S | |
| LIFT=1 | | | | | | SL | 4 | |
| SWJ | JMP | RESET | JMP TO OFF LINE | | | AS | S | |
| | | | | | | BNZ | LOCR | |
| DIAL=1 | | | | | | LIS | 1 | |
| SW7 | LI | H'2D' | | | | LR | S,A | |
| | LR | S,A | INITIALIZE COUNTER | | LOCR | LISU | 7 | |
| | | | | | | LISL | 7 | |
| | INS | 4 | | | LOCA | LR | S,A | A OR P TO DSP |
| | NI | H'7F' | RELAY 3 A | | | LI | H'FD' | |
| SW6 | OUTS | 4 | | | | LR | 6,A | |
| | BR | SW0 | | | | LI | H'E8" | |
| RELAY 3 A | | | | | LOCF | LR | 7,A | |
| SW3 | CLR | | | 35 | LOCC | PI | EXSHT | |
| | AS | S | | | | DI | | |
| | BZ | SWJ | | | | AS | 1 | |
| SW0 | EI | | | | | BNZ | LOT2 | BR ON DIGIT 0 |
| | ROUTINE TO LOAD THE CONTENT OF THE ELAPSE TIMER TO THE DISPLAY BUFFER | | | | | LIS | H'0A' | |
| | | | | | | LR | 1,A | |
| | | | | 40 | LOT2 | PI | LORAM | |
| | | | | | | DI | | |
| TIMDSP | LIS | 1 | | | | LIS | 1 | |
| | SL | 4 | | | | NS | 7 | |
| | NS | 4 | TEST TIMDSP FLAG | | | BNZ | LOCC | |
| | | | | | | LISU | 7 | |
| | BZ | CLKDSP | BR ON TIMDSP 0 | 45 | | LISL | 4 | |
| | | | | | | LIS | H'A' | |
| | DCI | RTADR | | | | XS | S | |
| | PI | LOTEXT | 'TIMERBBB." | | | BNZ | LOCD | |
| | DI | | | | | LR | S,A | BLANK 1ST 0 IN HR |
| | LI | H'FA' | | | | | | |
| | LR | 6,A | | 50 | LOCD | DS | 6 | |
| | LI | H'EE' | | | | LR | A,6 | |
| | BR | LOCF | | | | CI | H'F4" | |
| SWBS | BR | MP | | | | BNZ | LOCC | BR ON NOT LAST |
| | ROUTINE TO LOAD THE REAL TIME CLOCK TO THE DISPLAY BUFFER WHEN CLKDSP FLAG IS SET | | | | LOCZ | EI | | |
| | | | | | | BR | KEYSCN | |
| | | | | 55 | | ROUTINE TO REMIND REDIAL WHEN TIME IS OUT | | |
| CLKDSP | LIS | 2 | | | TIMOUT | INS | 4 | |
| | SL | 4 | | | | NI | H'04' | TEST FOR BEEP SOUND |
| | NS | 4 | TEST CLKDSP FLAG | | | | | |
| | | | | | | BNZ | KEYSCN | BR ON NO BEEP SOUND |
| | BZ | TIMOUT | BR ON FLAG 0 | 60 | | | | |
| ALARM | | | | | | BEEP SOUND | | |
| | LIS | 4 | | | | DCI | TRADR | |
| | NS | 3 | TEST FOR ALARM OUT | | | PI | LOTEXT | |
| | | | | | | BR | KEYSCN | |
| | BZ | LOCE | BR ON NO ALARM | | KEYSUB | LR | K,P | |
| | | | | 65 | | LR | A,3 | |
| | COM | | | | | OI | H'20' | SET SUB FLAG |
| | NS | 3 | RESET ALMOUT FLAG | | KEYSCN | LIS | 4 | |
| | | | | | | SL | 4 | |
| | LR | 3,A | | | | NS | 3 | TEST KEYENT |

-continued

| | | | |
|---|---|---|---|
| | BZ | MP | FLAG BR ON NO KEY ENTRY |
| | COM | | |
| | NS | 3 | RESET KEYENT 140 FLAG |
| | LR | 3,A | |
| | LR | A,0 | |
| | CI | H'8E' | |
| | BZ | KDECOD | |
| | LI | H'CF' | |
| | NS | 4 | RESET CLKDSP, TIMDSP |
| | LR | 4,A | |
| KDECOD | DI | | |
| | INS | 4 | |
| | NI | H'FA' | |
| | OUTS | 4 | |
| | CLR | | |
| KLOP | INC | | |
| | BNC | KLOP | |
| | INS | 4 | |
| | OI | H'04' | |
| | OUTS | 4 | |
| | EI | | |
| | LR | A,0 | |
| | SL | 4 | |
| | SR | 4 | |
| | LR | 1,A | 0000,XXXX TO R01 |
| | LR | A,0 | |
| | SR | 4 | |
| | SR | 1 | |
| | BNZ | KALPN | |
| | JMP | NUMKEY | JMP TO NUMERIC ROUTINE |
| KALPN | LR | A,4 | |
| | NI | H'FB' | RESET DIAL FLAG |
| | LR | 4,A | |
| | INS | 4 | |
| | OI | H'B8' | CLOSE S2,S3, OPEN S1 |
| | OUTS | 4 | |
| | CLR | | |
| | AS | 0 | |
| | BM | KMOD | BR ON MODE KEY |
| | SR | 4 | |
| | SL | 4 | |
| | SR | 1 | |
| | AS | 1 | |
| | LR | 1,A | |
| | JMP | ALPKEY | |
| MODE KEY ENTRY | | | |
| KM0D | XI | H'B0' | |
| | LR | 1,A | SAVE ENTRY TO R01 |
| KBSADD | SL | 1 | FORM 2 TIMES ENTRY |
| | DCI | (BSADR-H'70') | |
| | ADC | | |
| | LM | | LOAD HIGH ORDER BYTE ADDRESS |
| | LR | QU,A | LOAD TO QU |
| | LM | | LOAD LOWER ORDER BYTE ADDRESS |
| | LR | QL,A | LOAD TO QL |
| | LR | P0,Q | BR TO KEY SERVICE ROUTINE |

D. KEY SERVICE ROUTINES

The following routines, all of which branch back to the common termination point in the main program sequence, service keystrokes of various kinds whenever called upon by the main program. These routines are arranged in alphabetical order by name.

| | | | |
|---|---|---|---|
| ALARM KEY ROUTINE | | | |
| ALMKEY | LI | H'D9' | |
| | LR | 7,A | |
| | DCI | ALADR | |
| | BR | CLK11 (Next routine) | |
| KEY SERVICE ROUTINE TO DISPLAY CLOCK AND/OR SET CLOCK DEPENDING ON VALUE OF STORE FLAG | | | |
| CLKKEY | LIS | 2 | |
| | NS | 4 | TEST STORE FLAG |
| | BZ | CLKBS | BR ON FLAG 0 |
| CLK15 | LI | H'E9' | |
| | LR | 7,A | |
| CLK0 | DCI | CPADR | 'TIME PLS' |
| | LISU | 4 | |
| CLK11 | LISL | 4 | |
| | CLR | | |
| | LR | S,A | CLR PM/-AM FLAG |
| | PI | LOTEXT | |
| | LR | 6,A | |
| CLK10 | PI | KEYSUB | |
| | PI | CLRDSP | |
| CLK1 | LR | A,1 | |
| | AI | (H'00'-ENTER) | |
| | BZ | CLK2 | BR ON 'ENTER' KEY |
| | PI | LORAM | |
| | PI | KEYSUB | |
| | BR | CLK1 | |
| CLK2 | LISU | 7 | |
| | LISL | 7 | PT 1ST DISPLAY |
| CLKLOP | LR | A,D | |
| | CI | H'0A' | |
| | BNZ | CLK4 | BR ON NOT 'A' |
| | CLR | | |
| CLK4 | NI | H'0F' | |
| | LR | 1,A | |
| | PI | LOSHT | |
| | LR | A,IS | |
| | CI | H'38' | |
| | BNZ | CLKLOP | |
| | JMP | COM3 | |
| ALPHABETIC KEY SERVICE ROUTINE | | | |
| PASS PARAMETER: | | | |
| SUB: R03-5 :1-RETURN | | | |
|         0-DIRECT DIAL | | | |
| R01 : ALPHABETIC KEY ENTRY | | | |
| STORE : R04-1 :1-DIRECT STORE | | | |
|         0-DIRECT DIAL | | | |
| ALPKEY | LIS | 2 | |
| | SL | 4 | 20 to ACC |
| | NS | 3 | TEST SUB FLAG |
| | BZ | ALP1 | BR ON DIRECT DIAL |
| | PK | | RETURN |
| INDEX ADDRESS CALCULATION | | | |
| ALP1 | LR | A,1 | |
| | SR | 4 | |
| | SR | 1 | TEST IF 2ND COL ENTRY |
| | BZ | ALP2 | BR ON 1ST COL ENTRY |
| ADJUST 2ND COL ENTRY | | | |
| | DS | 1 | |
| | DS | 1 | |
| ALP2 | LR | A,1 | |
| | AI | H'EF' | DATA - H'11' |
| | LR | 1,A | |
| DATA TIMES 12 | | | |
| | SL | 1 | 2 TIMES |
| | SL | 1 | 4 TIMES |
| | SL | 1 | 8 TIMES |
| | LR | 1,A | |
| | CLR | | |
| | BP | ALP3 | BR ON LOWER BYTE < FF |
| ADDRESS LOWER OVERFLOW | | | |
| | LIS | 1 | |
| ALP3 | OUTS | 1 | ADDRESS UPPER TO PORT1 |
| | LR | A,1 | |
| | SL | 1 | |

-continued

```
               OUTS   0           ADDRESS LOWER TO
                                  PORT0
        TEST STORE FLAG
               LIS    2
               NS     4
               BNZ    DIRSTO
        DIRECT DIAL HERE
DIRDIA         PI     TELR         CALL TO READ TEL.
                                   NO.
               CLR
               AS     6
               BNZ    DIRNUM
               DCI    MEADR        'MEMORY EMPTY'
               BR     COM2
DIRNUM         LIS    2
               NS     3
               BNZ    COM7
               PI     KDIAL1
               JMP    COM6
               JMP    TELENT
        NAME DIALING ROUTINE
        (This routine is presented in Section E)
        THIS ROUTINE SERVES TO DECODE NUMERIC
        KEY ENTRIES AND, IF IN NORMAL DIALLING,
        STORES THE DIGIT IN THE DISPLAY AND
        DIALLING BUFFERS.
        SUBROUTINES CALLED :
        CLRRAM
        LOSHT
        LORAM
        REGISTERS USED :
        R08 : WORKING REGISTER FOR ACC
        R01 : VALID KEY ENTRY
        R06 : RAM BYTE INDEX
        R07 : RAM DIGIT INDEX
NUMKEY         LIS    3
               SL     4            20 to ACC
               NS     3            TEST SUB FLAG
               BZ     NUMDL
               PK                  RETURN TO CALLING
                                   PROGRAM
NUMDL          LR     A,1
               CI     YES
               BNZ    NUM1
               JMP    LIST
NUM1           CI     ENTER
               BNZ    NUM2
               LR     A,3
               OI     H'02'        SET CHECK FLAG
               LR     3,A
               LISU   4
               LISL   7
               LI     H'3C'
               LR     S,A
               BR     COM4
NUM2           AI     H'F4'        TEST FOR NUMERIC
               BC     COM3         BR ON NON-NUMERIC
NUMX           LIS    4
               NS     4            TEST DIAL FLAG
               BNZ    NUMDL1
NUMDL0         LIS    4
               XS     4            SET DIAL FLAG
               LR     4,A
               PI     CLRDSP
               LR     6,A
               LISU   2
               LISL   3
               LR     S,A          CLR DIALLING DIGIT
                                   INDEX
NUMDL1         PI     LORAM
               PI     KDIAL3
               BR     COM6
        ROUTINE TO SERVE THE DIAL/REDIAL KEY
        SUBROUTINE CALLED :
        OFFLIN
        KDIAL2
        KDIAL1
REDIAL         LIS    2
               SL     4
               NS     3            TEST SUB FLAG
               BZ     RED2         BR ON SUB 0
               PK
RED2           PI     KDIAL2
               BR     COM6
        KEY SERVICE ROUTINE TO OFF
        TELEPHONE LINE
RESET          LR     A,4
               NI     H'79'        RESET DIAL, LIFT,
                                   STORE FLG
               LR     4,A
               INS    4
               NI     H'EF'        OPEN S2, DISABLE
                                   TONGEN
               OUTS   4
        SET DELAY FOR 0.8 SEC.
               LI     H'3C'
               LR     8,A
               PI     DELAY
               INS    4
               OI     H'B8'        CLOSE S2, S3, OPEN S1
               OUTS   4
               LIS    1
               NS     4
               BZ     CLKBS        BR ON REDIAL TIMER
                                   OFF
               LISU   7
               LISL   7
               LR     A,S
               CI     H'0B'
               BC     NUMK         BR ON 1st DIT NUMERIC
               JMP    COM3
        KEY SERVICE ROUTINE TO
        ACTIVATE THE REDIAL TIMER
        PASS PARAMETER:
        NONE
        RETURN PARAMETER:
        TEXT 'REDIAL TIMER ON'
        D'240' to R38
        REDIAL TIMER FLAG SET
RETKEY         LIS    2
               NS     4
               LISU   3
               BNZ    ALMKEY
RETK1          LISL   6            PT REDIAL TIMER
               LI     H'B4'        INITIALIZE COUNTER
               LR     S,A          INITIALIZE TIMER FOR
                                   3 MINS
               LR     A,4
               XI     H'01'        COMPLEMENT
                                   REDIALTIMER
                                   FLA
               LR     4,A
               NI     H'01'
               DCI    OFADR        'OFF'
               BZ     COM2
               DCI    RTADR
               BR     COM2
        KEY SERVICE ROUTINE
        TO SET STORE FLAG
STORE          LR     A,4
               OI     H'02'        SET STORE FLAG
               BR     COM8
        TIMER KEY SERVICE ROUTINE
TIMKEY         LI     H'10'
               NS     4            TEST TIMDSP FLAG
               BZ     TMK1         BR ON TIMDSP 0
               LIS    8
               XS     4            COMPLEMENT TIMER
                                   FLAG
               LR     4,A
               NI     8            TEST TIMER FLAG
               NI     8            TEST TIMER FLAG
               BZ     RMK1         JMP ON TIMER 0
               LISU   4
               LISL   6
               CLR
               LR     D,A          CLR MIN
               LR     S,A          CLR SEC
TIMK1          LR     A,4
               OI     H'10'        SET TIMDSP FLAG
               LR     4,A
               BR     COM6
```

E. NAME KEY SERVICE ROUTINE AND ROUTINES CALLED BY IT

This routine takes control of the computer when the NAME key is depressed. It calls upon the subroutine KEYSUB to read in the next keystrokes. Actually, KEYSUB is simply an entry into the main program (see Section C) at KEYSUB, the point where the keys are scanned, with a flag set to indicate a subroutine call. The main program cycles as usual until a key is struck. If a letter or a number or a stroke of the DIAL/REDIAL key, appropriate logic in the routines ALPKEY, NUMKEY, or REDIAL (Section D) detect the subroutine call and execute a "PK" instruction to return program control to NAME. If any other key is struck, the main program processes the keystroke in the usual way just as if NKEY had not initiated the I/O operation.

All these routines ultimately transfer program control to the common termination point for the key service routines (Section F).

1. NAME Routine - First Level I/0 Monitor

```
        NAME DIALING INITIALIZATION
NAME    DCI    NMADR
        PI     LOTEXT
        LR     6,A
        LR     11,A
        LI     (H'FF'-H'40')
        NS     4
        LR     4,A
        LIS    1
        OUTS   1
        LI     H'C0'
        OUTS   0
        READ NAME OR CONTROL KEY
        PI     KEYSUB
        PI     CLRDSP
NREAD   LR     A,1
        CI     H'0A'
        BC     NDSPLY        BR ON <= 0A
        CI     H'10'
        BNC    NDSPLY        BR ON > 10
        CI     DEL
        BZ     MDEL          BR ON DEL KEY
        CI     YES
        BNZ    NAME2         BR ON NOT LIST KEY
NAME1   JMP    LIST
NAME2   CLR
        LR     11,A
        AS     6
        BZ     NAME1         BR ON ENTRY NOT
                             EXIST
        LIS    2
        NS     4             TEST STORE KEY
        BNZ    NSTORE        BR ON STORE
        JMP    SEARCH
NDSPLY  PI     LORAM
        PI     KEYSUB
        BR     NREAD
```

2. ROUTINES CALLED BY NAME ROUTINE

MDEL INITIALIZE THE SYSTEM FROM COLD START AND CLEARS THE MEMORY (DELETING ALL RECORDS)

```
MDEL    DCI    EMADR
        PI     LOTEXT
        LI     H'C0'
        LR     11,A
        PI     KEYSUB
        LR     A,1
        CI     YES
        BNZ    NAME
        PI     RAMWR
        DCI    ERADR
        JMP    COM2
```

LIST & NLIST ROUTINES
LIST OR NLIST ROUTINE LISTS THE NEXT RECORD BELOW THE CURRENT ONT (LIST NAME ONLY).
LIST ROUTINE STARTS THE LISTING FROM THE FIRST RECORD IN MEMORY, LISTING IS CYCLIC (I.E. RETURN TO BEGINNING IF MEMORY IS EXHAUSTED).

```
LIST    LIS    1
        OUTS   1
        LI     H'C0'
        OUTS   0
        LI     H'80'
        LR     11,A
        PI     RAMWR
        SL     1
        BZ     DIRMEX
NLIST   PI     RSRCH
        BZ     LIST
        LIS    15
        LR     6,A
        BR     LONAME
DIRMEX  DCI    MEADR         'MEMORY EMPTY'
        BR     COM2
```

(Note: LONAME appears below)
NSTORE ROUTINE STORES A NEW RECORD INTO MEMORY

```
NSTORE  PI     RAMWR
        SL     1
        BNZ    NSTORE
        LISU   3
        LISL   0
        INS    1
        LR     1,A
        NI     H'07'         TEST FOR MEMORY
                             FULL
        CI     H'07'
        BNZ    NSTR
        INS    0
        AI     H'31'
        BNC    NSTR          BR ON NOT FULL
        DCI    MFADR
        JMP    COM2
NSTR    INS    0
        LR     D,A
        LISU   7
        LISL   7
        LR     A,S
        SR     4
        OI     H'4C'
        LR     10,A
        BR     WRNM
        WRITE NAME INTO MEMORY
WNAME   CLR
        AS     S
        BNZ    WRTNM
WRNTEL  JMP    TELENT
WRTNM   SR     4
        OI     H'4C'
        LR     11,A
        PI     RAMWR
WRNM    LIS    H'0F'
        NS     S
        OI     H'40'
        LR     11,A
        PI     RAMWR
        LR     A,IS
        AI     H'FF'
        LR     IS,A
        CI     H'2F'
        BZ     WRNTEL
        BR     WNAME
```

RETURNS FROM TELENT WITH TEL. NO.
IN THE DISPLAY BUFFER
NNUM SEGMENT
SEARCH ROUTINE SEARCH THE MEMORY BANK FOR A MATCH WITH THE STRING IN THE DSP. BUFFER, SEARCH STARTS FROM CURRENT RAM CURSOR END MARKER IN THE DSP BUFFER.

```
SEARCH  CLR
        LR     10,A
        PI     RSRCH
        BNZ    SLOOP
SEXIT   DCI    CFADR
        LI     H'89'         SET NAME KEY
                             ENTRY
```

```
            LR      0,A
            LR      A,3
            OI      H'C0'         SET KRTST,KEYENT
            LR      3,A
            JMP     COM2
SLOOP       PI      TXTCHR
            BZ      SMATCH
SNEXT       PI      READBL
            BM      SEARCH
            XS      6
            BZ      SLOOP
            CLR
            LR      6,A
            BR      SNEXT
    (Note: SMATCH follows immediately)
SMATCH ROUTINE
ENTERED WHEN A MATCHING RECORD IS FOUND
SMATCH      LR      A,10
            INC
            LR      10,A
            SL      1
            LR      7,A
            PI      BACKSH
            LR      6,A
            BR      LONAME
    (Note: LONAME follows immediately)
NOTE: The routine LONAME that follows is the entry
point to the NKEY routine which is the Second
Level I/O Monitor
LONAME ROUTINE TRANSFERS THE NAME OF THE
CURRENT RECORD TO THE DISPLAY BUFFER.
THE RETURN PATH IS DETERMINED BY R(06). IN EXIT,
R(07) WILL CONTAIN THE LENGTH OF THE NAME
IN TWO'S COMPLEMENT
LONAME      PI      CLRDSP
            LISU    7
            LISL    7
LOCYCLE     PI      READBL
            BM      LOUT
            LR      S,A
            LR      A,IS
            AI      H'FF'
            LR      IS,A
            BR      LOCYCL
LOUT        LR      A,IS
            AI      H'C1'
            LR      7,A
            BR      NKEY
    (Note: the KNEY routine follows immediately)
```

3. NKEY Routine-Second Level I/O Monitor

NKEY is a second level input/output monitor program which accepts typed letters and numbers. It fetches them by calling upon the subroutine KEYSUB to wait for the next keystroke. Actually, KEYSUB is simply an entry into the main program (see Section C) at KEYSUB, the point where the keys are scanned, with a flat set to indicate a subroutine call. The main program cycles as usual until a key is struck. If a letter or a number or a stroke of the DIAL/REDIAL key occurs, appropriate logic in the routines ALPKEY, NUMKEY or REDIAL (Section D) detect the subroutine call and execute a "PK" instruction to return program control to NKEY. If any other key is struck, the main program processes the keystroke in the usual way, just as if NKEY had not initiated the I/O operation.

```
        NKEY ROUTINE MONITORS KEY ENTRY
NKEY        PI      KEYSUB
            CLR
            AS      6
            LR      A,1
            BNZ     NSKIP
            CI      SRCH
            BZ      SRNEW
NSKIP       CI      KLIST
            BZ      NLIST
            CI      DEL
            BZ      NDEL
            BR      NTELE
(Note: NLIST, an entry to LIST, precedes this
routine)
            4. Routines called by NKEY
    KEY ENTRY DEFAULT, NTELE LIST TELE. NO.,
    OPTION IS DIAL OR VIEW ONLY
NTELE       PI      TELR
            LR      A,0
            CI      H'8A'        TEST FOR DIAL KEY
            BNZ     NEXIT
            PI      KDIAL1
            JMP     COM6
NEXIT       JMP     COM7
SRNEW ROUTINE RECOVERS ORIGINAL NAME
UNDER SEARCH AND STARTS SEARCH CYCLE
AGAIN
SRNEW       LR      A,10
            AI      H'3F'
            LR      IS,A
            PI      CLRSHT
            BR      SEARCH
(Note: SEARCH precedes this routine)
NDEL ROUTINE DELETES THE CURRENT
RECORD IN THE MEMORY
NDEL        PI      TELR
            LISL    0
            LISU    3
            LR      A,7
            SL      1
            AS      6
            LR      6,A
            DS      6
NMOVE       LR      A,6
            LR      7,A
            PI      RAMWR
            OI      H'C0'
            LR      11,A
            INS     1
            LR      I,A
            INS     0
            LR      D,A
            PI      BACKSH
            LIS     15
            NS      11
            BZ      NDEXIT
            PI      RAMWR
            LR      A,I
            OUTS    1
            LR      A,D
            OUTS    0
            BR      NMOVE
NDEXIT      PI      RAMWR
            JMP     TELJ
```

F. COMMON TERMINATION POINT FOR THE KEY SERVICE ROUTINES

The various segments of the main program all branch back to this common termination point. From here, program control returns to "MP", the starting point of the main program.

```
                    DIRECT STORE
DIRSTO      LR      A,4
            OI      H'40'        SET DIRECT/-
                                 FLAG
            LR      4,A
            TELEPHONE NUMBER ENTRY
TELENT      DCI     NUADR
            PI      LOTEXT
TELE        LR      6,A          CLR RAM
                                 BYTE INDEX
            PI      KEYSUB
            PI      CLRDSP
```

-continued

| | | | |
|---|---|---|---|
| TELA | LR | A,1 | |
| | AI | (H'00'-ENTER) | |
| | BZ | TELB | BR ON ENTER |
| | CI | (DEL-ENTER) | |
| | BZ | TELP | BR ON DEL KEY |
| TELC | LR | A,1 | |
| | CI | H'0B' | |
| | BP | TELF | BR ON ACC =H'0B' |
| WRONG KEY | | | |
| | DCI | ILADR | |
| | PI | LOTEXT | |
| | LIS | 6 | |
| | SL | 4 | |
| | LR | 8,A | |
| | PI | DELAY | |
| | BR | TELENT | |
| TELF | PI | LORAM | |
| | PI | KEYSUB | |
| | BR | TELA | |
| TELL | LR | A,4 | |
| | SL | 1 | |
| | BM | TELM | BR ON DIR DIAL |
| NAME DIALLING NNUM SEGMENT | | | |
| NNUM | PI | TWN | |
| | LI | H'40' | |
| | LR | 11,A | |
| | PI | RAMWR | |
| | LISU | 3 | |
| | LISL | 0 | |
| | LR | A,I | |
| | OUTS | 1 | |
| | LR | A,D | |
| | OUTS | 0 | |
| | PI | DECA | |
| | LR | A,10 | |
| | LR | 11,A | |
| | PI | RAMWR | |
| | BR | TELD | |
| TELM | PI | TWN | CALL TO WRITE NO. |
| TELD | DCI | NSADR | |
| | BR | COM2 | |
| TELB | AS | 6 | |
| | BNZ | TELL | BR ON ENTRY EXIST |
| TELP | LR | A,4 | |
| | SL | 1 | |
| | BP | TELC | BR ON NAME DIAL |
| | PI | CLRDSP | |
| | PI | TWN | |
| TELJ | DCI | NDADR | |
| COM2 | PI | LOTEXT | |
| COMM | LIS | 6 | |
| | SL | 4 | |
| | LR | 8,A | INITIALIZE DELAY FOR 1.5 S |
| COM7 | PI | DELAY | |
| COM3 | LIS | 2 | |
| | COM | | |
| | NS | 4 | RESET STORE FLAG |
| COM8 | LR | 4,A | |
| COM5 | LR | A,4 | |
| | OI | H'20' | SET CLKDSP |
| | LR | 4,A | |
| COM6 | LI | H'DD' | |
| | NS | 3 | RESET SUB. CHECK FLAG |
| | LR | 3,A | |
| COM4 | JMP | MP | |

G. POWER UP ROUTINE

This routine which begins in core memory position zero initializes the system when power is first applied to the system. It then branches to the common termination point (Section E) from which point program control branches to MP at the start of the main program (Section C).

| | | | |
|---|---|---|---|
| POWRUPM IS THE POWER UP ROUTINE READY FOR MASKING | | | |
| POWRUP | LI | H'BC' | 1011,1100 |
| | OUTS | 4 | INITIALIZE PORT 4 |
| | CLR | | |
| POW1 | LR | IS,A | |
| | CLR | | |
| | LR | S,A | |
| | LR | A,IS | |
| | INC | | |
| | CI | H'40' | |
| | BNZ | POW1 | |
| | LI | H'95' | |
| | OUTS | 7 | INITIALIZE TIMER COUNTER |
| | LI | H'EA' | |
| | OUTS | 6 | INITIALIZE PORT 6 FOR INT |
| | JMP | COM5 | | cl H. INTERRUPT ROUTINE

At periodic intervals, clock pulses interrupt the main program and cuase execution of the following interrupt service routine which generates dial pulses and tones, and adjusts counters to reflect the passage of time. Signal filtering to minimize the effects of contact bounce is also carried out here. This program is loaded into consecutive core locations beginning with location $20_{16}$.

| | | | |
|---|---|---|---|
| THIS ROUTINE SERVES TO SAVE PREVIOUSLY INVOLVED REGISTERS' CONTENTS IN THE PROGRAM SEGMENT BEING INTERRUPTED. | | | |
| W TO J | | | |
| ISAR TO R10 | | | |
| ACC TO R 11 | | | |
| PORT 4 TO R 16 | | | |
| PORT 5 TO R 17 | | | |
| PORT 1 TO R 1F | | | |
| PORT 0 TO R 1E | | | |
| INT | LR | 9,A | |
| | LR | A,IS | |
| | LISU | 2 | |
| | LISL | 0 | PT R10 |
| | LR | I,A | SAVE ISAR TO R10,Pt R11 |
| | LR | A,9 | RESTORE ACC |
| | LR | S,A | SAVE ACC TO R11 |
| | LR | J,W | SAVE W TO J |
| | LISL | 6 | PT R16 |
| | INS | 4 | |
| | LR | I,A | PORT4 TO R16,PT R17 |
| | INS | 0 | |
| | LR | S,A | PORT0 TO R17 |
| | LISU | 3 | PT R1F |
| | INS | 1 | |
| | LR | D,A | PORT1 TO R1F,PT R1E |
| | LR | Q,DC | SAVE DATA COUNTER |
| ROUTINE TO TEST DIAL FLAG | | | |
| | LIS | 4 | |
| | NS | 4 | TEST DIAL FLAG |
| | BZ | BS20 | |
| PULSE AND TONE DIALLING ROUTINE | | | |
| | LISU | 2 | |
| | LISL | 3 | PT INDEX |
| | LR | A,S | FETCH INDEX |
| | AI | H'40' | |
| | COM | | |
| | INC | | 17S COMPLEMENT |
| | LR | 5,A | |
| | CI | H'C0' | |
| | BNZ | D3 | BR ON INDEX NOT 0 |
| INDEX EQ 0 | | | |
| | LR | A,2 | |
| | NI | H'F7' | RESET TONSEN FLAG |
| | LR | 2,A | |
| D2 | LI | H'D2' | |

-continued

```
D7      LISL  5         PI ACP
        LR    I,A       LOAD ACP,PT STACK P4
        LR    A,S       FETCH P4
        OI    H'20'     OPEN S1
        LR    S,A
        OUTS  4
        LISL  3         PT INDEX
        LR    A,S       LOAN INDEX
        XS    6         COMPARE INDEX TO
                        POINTER
        BNZ   D20       BR ON NOT EQ
     INDEX EQUAL POINTER
D21     LIS   8
        XS    2         SET TONSEN
        LR    2,A
BS20    BR    DSPSCN
D20     LI    H'3F'
        AS    S
        LR    IS,A      PT DIGIT IN DISPLAY
        LR    A,S       FETCH DIGIT
        SL    1         TIMES 2
        LISU  2
        LISL  3         PT INDEX
        DS    I         INDEX-1, PT DIGIT
        LR    S,A       LOAD DIGIT
        AI    H'EA'
        BNZ   D90       BR ON NOT PAUSE
        LR    S,A       CLR DIGIT BUFFER
        BR    D2
D90     BNC   DSPSCN    BR ON NUMERIC
D15     LI    H'24'
        XS    4         RESET DIAL FLAG
        LR    4,A
        BR    D21
     INDEX NOT 0
D3      LISL  5
        DS    D         ACP-1, PT DIGIT
        BNZ   DSPSCN    BR ON ACP NOT 0
        CRL
        OUTS  1
        INS   1
        SL    1         TEST FOR PUL OR
                        TONE DIAL
        BP    D9        BR ON PULSE
                        DIALLING
     TONE DIALLING
        LIS   8
        XS    2         COMPLEMENT TONSEN
                        125 FLAG
        LR    2,A
        NI    H'08'     TEST TONSEN FLAG
        BZ    TONSTP    BR ON STOP TONE
TONSEN  DCI   (TONCOD-1)
        LR    A,D
        SR    1         DIGIT DIVIDED BY 2
        ADC             ADD TO DATA
                        COUNTER
        LM              FET TONE CODE
        OUTS  0
        LISL  6         PT STACK PORT 4
        LR    A,S
        NI    H'D7'     ENABLE LATCH AND
                        TON GEN
        LR    D,A       PT ACP
        OUTS  4
        LIS   H'D'      LOAD D24
        LR    S,A
        BR    DSPSCN
TONSTP  LISL  6
        LR    A,S       LOAD STACK PORT 4
        DI    H'28'     DISABLE TONE GENE-
                        RATOR
        LR    S,A
        LIS   H'D'      LOAD D24
        BR    D7
     PULSE DIALLING
D9      CLR
        AS    S
        BNZ   D8        BR ON DIGIT NOT 0
        INS   6
        LI    H'18'     INITIALIZE ACP FOR
                        400 MS
        BP    D11       BR ON 400 MS
        SL    1         INITIALIZE ACP FOR
                        800 MS
D11     BR    D7
D8      LIS   1
        NS    I         AND 01, PT ACP
        BZ    DBREAK    BR ON DIGIT EVEN
DMAKE   LIS   2
        LR    I,A       INITIALIZE ACP FOR
                        33.3 MS
        LR    A,S
        OI    H'10'     CLOSE S2
        BR    DOUT
DBREAK  LIS   4
        LR    I,A
        LR    A,S
        NI    H'EF'     OPEN S2
DOUT    NI    H'DF'     CLOSE S2
        LR    D,A       LOAD STACK P4, PT
                        ACP
        OUTS  4
        INS   6
        BM    DOUT1     BR ON 10 PPS
        LR    A,S       FETCH ACP
        SR    1         20 PPS
        LR    S,A
DOUT1   LISL  4         PT DIGIT
        DS    S         DIGIT -1
     THIS ROUTINE FORMS PART OF THE EXTINT
     ROUTINE AIMMING AT LOADING DATA FROM
     DISPLAY BUFFER TO THE LED DISPLAY
     SEQUENTIALLY
DSPSCN  LISL  7
        LISU  7
        CLR
        OUTS  0
        OUTS  1         CLR DSP
        INS   4
        OI    1         ENABLE DECODER
        OUTS  4
SCNLOP  LR    A,IS
        SL    4
        SR    4
        OUTS  H'5'
        LR    A,S
        SL    H'1'
        BZ    BNKSKP
        DCI   (DSPADR-2)
        ADC
        LM
        OUTS  H'0'
        LM
        OUTS  H'1'
        LIS   4
        NS    4
        BZ    DSP10     BR ON DIAL FLAG 0
        LR    A,IS
        AS    5
        CLR
        BC    DSP10
        LI    H'37'
DSP10   AI    H'C0'
DSPX    INC
        BNC   DSPX
        OUTS  0
        OUTS  1
BNKSKP  LR    A,IS
        AI    H'FF'
        LR    IS,A
        CI    H'2F'
        BNZ   SCNLOP
     ROUTINE, WHEN THE DELAY FLAG
     IS SET, TO DECREASE THE DELAY
     COUNTER BY ONE AND RESET THE DELAY
     FLAG WHEN COUNTER EQUALS 0
DELAY1  LIS   2
        NS    2
        BZ    SCNKEY    BR ON DELAY FLAG 0
        DS    8
        BNZ   CK
     DELAY COUNTER 0
        COM
```

| | | | |
|---|---|---|---|
| | NS | 2 | RESET DELAY FLAG |
| | LR | 2,A | |
| SCNKEY | LISU | 3 | |
| | LISL | 5 | PT TO DB |
| | CLR | | |
| | AS | 3 | |
| | BP | KCLR | |
| KRTST1 | DS | S | DECREASE DEBOUNCE COUNTER |
| | BNZ | KCLR | |
| KRDCO | LI | H'7F' | |
| | NS | 3 | RESET RELEASE TEST FLAG |
| | LR | 3,A | |
| | LIS | H'3' | |
| | LR | S,A | RESET DEBOUNCE COUNTER |
| KCLR | CLR | | |
| KSCLOP | SL | 4 | |
| | SR | 4 | CLR OLD ENTRY |
| | INC | | POINT SCAN COUNTER TO NEXT |
| | CI | H'0F' | |
| | BZ | CK | BR ON COUNTER DVF |
| | OUTS | 5 | |
| | INS | 5 | |
| | LR | 5,A | STORE NEW ENTRY INTO R2 |
| | SR | 4 | |
| | LR | A,5 | RESTORE SCAN COUNTER |
| | BZ | KSCLOP | BR ON NO ENTRY |
| KENTRY | CLR | | |
| | AS | 3 | |
| | LR | A,5 | |
| | BP | KDEBON | BR ON RELEASE TEST NOT REQ |
| KRTST2 | XS | 0 | |
| | BNZ | KRET | |
| | BR | KDCI | |
| | DEBOUNCE ROUTINE | | |
| KDEBON | XS | 0 | COMPARE WITH OLD ENTRY |
| | BZ | KENSEQ | BR ON ENTRIES EQUAL |
| KENNEQ | LR | A,5 | SAVE NEW ENTRY IN R0 |
| | LR | 0,A | |
| KDCI | LIS | H'3' | |
| | LR | S,A | REINITIALIZE DEBOUNCE COUN |
| KRET | LR | A,5 | RESTORE SCAN COUNTER |
| | BR | KSCLOP | SCAN ANOTHER ROW |
| KENSEQ | DS | S | DECREASE DEBOUNCE COUNTER |
| | BNZ | KRET | |
| KDCEQ0 | LIS | 0 | |
| | LR | S,A | |
| | LR | A,3 | |
| | OI | H'C0' | SET KRIST, SET KEYENT |
| | LR | 3,A | |
| | ROUTINE TO UPDATE THE REAL TIME CLOCK COUNTERS | | |
| | FLAG : R02-7 : PM/AM | | |
| | R04-7 : CLOCK | | |
| CK | LISU | 4 | |
| | LISL | 0 | PT ACP COUNTER |
| | DS | S | |
| | BNZ | RET | BR ON COUNTER NOT 0 |
| | TIME-OUT COUNTER ROUTINE | | |
| | LISL | 7 | |
| | CLR | | |
| | AS | S | |
| | BZ | TIM0 | |
| | DS | S | |
| | TIMER ROUTINE | | |
| TIM0 | LIS | 8 | |
| | NS | 4 | TEST TIMER FLAG |
| | BZ | TIM1 | BR ON TIMER 0 |
| | LISL | 5 | PT SEC OF TIMER |
| | LI | H'67' | |
| | ASD | S | |
| | LR | S,A | |
| | AI | H'A0' | |
| | BNZ | TIM1 | BR ON SEC NOT OVF |
| | LR | I,A | |
| | LI | H'67' | |
| | ASD | S | |
| | LR | S,A | |
| | REDIAL TIMER ROUTINE | | |
| TIM1 | LISL | 6 | PT REDIAL COUNTER |
| | LISU | 3 | |
| | CLR | | |
| | AS | S | |
| | BZ | TIM2 | |
| | DS | S | COUNTER -1 |
| | BR | SECCNT | |
| TIM2 | LI | H'21' | |
| | NS | 4 | TEST CLKDSP & REDIALTIMER |
| | CI | H'21' | |
| | BNZ | TIM3 | BR ON FLAG NOT 1 |
| | REDIALTIMER & CLKDSP 1 | | |
| | LI | H'B4' | INITIALIZE COUNTER |
| | LR | S,A | |
| | LI | H'CE' | |
| | NS | 4 | CLR CLKDSP,TIMDSP & REDIALTIMER FLAGS |
| | LR | 4,A | |
| | LISU | 2 | |
| | LR | A,S | |
| | NI | H'FB' | SET BEEP SOUND |
| | BR | TIM4 | |
| TIM3 | LISU | 3 | PT STACK PORT4 |
| | LR | A,S | |
| | OI | H'04' | RESET BEEP SOUND |
| TIM4 | LR | S,A | |
| SECCNT | LISU | 4 | |
| | LISL | 0 | |
| | LI | H'3C' | |
| | LR | I,A | INITIALIZE ACP,PT SEC |
| | LI | H'67' | |
| | ASD | S | |
| | LR | S,A | |
| | AI | H'A0' | |
| | BNZ | RET | BR ON SEC NOT OVF |
| MINCNT | LR | D,A | 0 TO SEC, PT ACP |
| | LI | H'40' | CALIBRATE ACP COUNTER |
| | LR | S,A | LOAD ACP |
| | LISL | 2 | PT MIN |
| | LI | H'67' | |
| | ASD | S | |
| | LR | S,A | |
| | AI | H'A0' | |
| | BNZ | ALARM | |
| HRCNT | LR | I,A | 0 TO MIN,PT HR |
| | LI | H'67' | |
| | ASD | S | |
| | LR | S,A | |
| | CI | H'12' | TEST FOR HR 12 |
| | BZ | CKFLAG | BR ON HR 12 |
| | BC | ALARM | BR ON HR<12 |
| | HOUR EQ 13 | | |
| | LIS | 1 | |
| | LR | S,A | |
| | BR | ALARM | |
| CKFLAG | LR | A,I | PI PM/0AM FLAG |
| | LIS | 3 | |
| | XS | S | COMPLEMENT FLAG |
| | LR | S,A | |
| | ALARM ROUTINE | | |
| ALARM | LISL | 4 | |
| | LISU | 3 | |
| | LR | A,S | |
| | LISU | 4 | |
| | XS | D | |
| | BNZ | RET | |
| | LR | A,IS | |
| | CI | H'21' | |
| | BNZ | ALM2 | |
| | ALARM OUT | | |
| | LR | A,3 | |

```
          OI      H'04'          SET ALMOUT FLAG
          LR      3,A
THIS ROUTINE SERVES TO RESTORE THE
CONTENTS OF THE REGISTERS BEING
SAVED DURING INITIALIZATION OF
EXTERNAL INTERRUPT.
REGISTERS RESTORED:
W
ISAR
ACC
PORT 4
PORT 5
PORT 0
PORT 1
RET       LISU    2
          LISL    6              PT R16
          LR      A,I            R16 TO ACC, PT R17
          OUTS    4              RESTORE PORT4
          LR      A,S            R17 TO ACC
          OUTS    0              RESTORE PORT0
          LISU    3              PT R1F
          LR      A,S            R1F TO ACC
          OUTS    1              RESTORE PORT1
          LISU    2
          LISL    1              PT R11
          LR      W,J            RESTORE STATUS REG.
          LR      A,D            R11 TO ACC, PT R10
          LR      9,A            SAVE ACC TO R09
          LR      A,S            R10 TO ACC
          LR      IS,A           R10 to ISAR
          LR      A,9
          LR      DC,Q           RESTORE DATA
                                 COUNTER
          EI
          POP
```

I. SUBROUTINES

The following subroutines are included as part of the program. Each is referred to by the name that appears on the first line of the subroutine. The subroutines are listed in alphabetical order by name.

```
          TWO'S COMPLEMENT OF THE OFFSET.
          LEVEL = 1
BACKSH    LR      K,P
BCKTST    CLR
          AS      7
          BZ      BKEXT
          INC
          LR      7,A
          PI      DECA
          BR      BCKTST
BKEXT     POP
          LOTEXT
SUBROUTINE TO LOAD TEXT FROM
ROM TO DISPLAY BUFFER
LEVEL : 2ND
PASS PARAMETER:
DC0 : ADDRESS OF TEXT
CLRDSP    DI
          DCI     BLADR
LOTEXT    DI
          LISU    7
          LISL    7
LOM1      LM
LOM2      LR      S,A
          LR      8,A
          LR      A,IS
          AI      H'FF'
          LR      IS,A
          AI      H'D1'
          BZ      EIRTN          BR ON LOAD LAST
          CLR
          AS      8
          BNZ     LOM1           BR ON DATA NOT END
                                 MARKER
CLRSHT    DI
          CLR
          BR      LOM2           BR TO LOAD AGAIN
EIRTN     CLR
          EI
          POP
SUBROUTINE TO DECREASE BY ONE THE
10 - BIT ADDRESS OF THE EXTERNAL
RAM STORED IN PORT 0 AND PORT 1
LEVEL : 2ND
DECA      DI
          INS     0
          AI      H'FF'          LOWER BYTE - 1
          OUTS    0
          BC      DECB
          INS     1
          AI      H'FF'          HIGHER BYTE - 1
          OUTS    1
DECB      EI
          POP
SUBROUTINE TO INITIALIZE A DELAY LOOP
AND WAIT UNTIL DESIRED TIME INTERVAL
HAS BEEN ELAPSED
LEVEL : 1ST
PASS PARAMETER:
DELAY PULSE COUNTER IN R08
RETURN PARAMETER : NONE
DELAY     LR      K,P
          EI
          LIS     2
          XS      2              SET DELAY FLAG
          LR      2,A            SET DELAY FLAG
DEL1      LIS     2
          NS      2
          BNZ     DEL1
          PK
SUBROUTINE TO EXTRACT A FOUR
BIT DATA FROM SCRATCHPAD RAM
LEVEL : 2ND
REGISTERS USED :
R01 : FOUR BIT DATA
R07 : RAM DIGIT INDEX
R08 : TEMPORARY STORAGE FOR ISAR
EXSHT     DI
          LR      A,IS
          LR      8,A
          LI      H'5F'
          AS      7
          SR      1
          LR      IS,A
          LIS     1
          NS      7              TEST INDEX EVEN OR
                                 ODD
          LR      A,S            LOAD FOUR BIT DATA
          BZ      EXEVEN         BR ON DIGIT EVEN
EXODD     SL      4
EXEVEN    SR      4
          LR      1,A
          DS      7              RAM DIGIT-1
          LR      A,8
          LR      IS,A           RESTORE ISAR
          CLR
          EI
          POP
SUBROUTINE TO LOAD DATA IN DIALLING
BUFFER TO DISPLAY BUFFER
LEVEL : 1ST
PASS PARAMETER :
DIALLING BUFFER - NO. TO BE LOADED
RETURN PARAMETER :
DISPLAY BUFFER - NO. TRANSFERRED
RAM BYTE INDES - PT TO THE LAST LOADED
DIGIT
KDIAL2    LR      K,P
          LISU    7
          LISL    7
          LR      A,S
          CI      H'0B'
          BC      DIA2
          PI      CLRDSP
          LR      6,A            CLR RAM BYTE INDEX
          LR      7,A            CLR RAM DIGIT INDEX
DIA1      PI      EXSHT
          AS      1
```

-continued

```
            BZ      DIA2
            PI      LORAM
            BNZ     DIA1        BR ON NOT LAST DIGIT
DIA2        CLR
            LISU    2
            LISL    3
            LR      S,A         CLR DIALLING DIGIT
                                INDEX
DIA6        CLR
            LR      7,A         CLR RAM DIGIT INDEX
            LR      A,4
            OI      H'04'       SET DIAL FLAG
            LR      4,A
            LIS     1
            NS      4           TEST REDIALTIMER
                                FLAG
            BNZ     DIA4        BR ON REDIALTIMER 1
            LISU    7
            LISL    7
DIA3        LR      A,S         FETCH DIGIT
            LR      1,A
            PI      LOSHT
            LR      A,IS
            AI      H'FF'
            LR      IS,A
            CI      H'2F'
            BNZ     DIA3        BR NOT LAST
DIA4        PK
KDIAL1      LR      K,P
            BR      DIA2
KDIAL3      LR      K,P
            BR      DIA6
        SUBROUTINE TO LOAD A DATA TO
        SCRATCHPAD RAM
        LEVEL : 2ND
        REGISTERS USED
        R08 : TEMPORARY STORAGE FOR ISAR
        R06 : RAM BYTE INDEX
        R01 : DATA TO BE LOADED
LORAM       DI
            LR      A,6
            CI      H'F0'
            BZ      LOY         BR ON LAST
            AI      H'3F'       ADD BASE ADDRESS
            LR      IS,A
            LR      A,1
            LR      S,A
            DS      6
LOY         EI
            POP
        SUBROUTINE TO LOAD A 4 BIT
        DATA TO SCRATCHPAD RAM
        LEVEL : 2ND
        REGISTERS USED:
        R08 : TEMPORARY STORAGE FOR ISAR
        R07 : RAM DIGIT INDEX
        R01 : DATA TO BE LOADED
LOSHT       DI
            LR      A,IS
            LR      8,A
            LI      H'5F'
            AS      7
            SR      1
            LR      IS,A
            LIS     1
            NS      7           TEST INDEX EVEN OR
                                ODD
            LR      A,1
            BNZ     SODD
SEVEN       CLR
            LR      S,A
            LR      A,1
            SL      4
SODD        AS      S
            LR      S,A         LOAD DATA
            DS      7           RAM DIGIT-1
            LR
            LR      IS,A
            CLR
            EI
            POP
        LOTEXT
(LOTEXT is an entry point into CLRDSP above)
        SUBROUTINE TO READ OR WRITE A
        4 - BIT DATA BETWEEN THE UP AND
        THE EXTERNAL RAM
        LEVEL : 2ND
        PASS PARAMETER:
        DATA : HL0 TO HL3
        W/-R : HL6 : 1-WRITE, 0-READ
        -INC : HL7 : 1-RAM ADDRESS NO CHANGE
                     0-RAM ADDRESS INCREASED
                           AFTER DATA TRANSFER
        RETURN PARAMETER :
        DATA : HL0 TO HL3
               ACC
        ADDRESS : PORT 0 AND PORT 1
RAMWR       DI
            LR      A,H'B'
            LR      8,A         SAVE FLAG IN R08
            SL      1
            BP      RAM1        BR ON READ
        WRITE TO RAM
            LR      A,H'B'
            OUTS    5
        SET WRITE
            INS     1
            OI      H'08'       0 to R/-W PIN OF RAM
            BR      RAM2
        READ FROM RAM
RAM1        OUTS    5           INITIALIZE PORT 5
                                FOR READ
        SET READ
            INS     1
            NI      H'F7'       1 TO R/-W PIN OF RAM
RAM2        OUTS    1
            NI      H'04'       TEST A10
            BZ      RAM3        BR ON A10 ZERO
            INS     4
            OI      H'02'       0 TO P4-1
            BR      RAM4
RAM 3       INS     4
            OI      H'40'       0 TO P4-6
RAM4        OUTS    4           ENABLE RAM
        READ DATA OR WRITE DATA NOW
            INS     5
            SL      4
            SR      4
            LR      H'B',A      SAVE DATA TO R0B
            INS     4
            NI      H'BD'       DISABLT EXT RAM
            OUTS    4
            CLR
            AS      8
            BM      INCB        BR ON ADDRESS NO
                                CHANGE
INCA        INS     0
            INC
            OUTS    0
            BNC     INCB        BR ON NO CARRY
            INS     1
            INC
            OUTS    1
INCB        LR      A,H'B'
            EI
            POP
        READBL SUBROUTINE READS TWO
        CONSECUTIVE BYTES IN RAM AND FORM 1
        WORD IN ACC & R(06) WITH 2 MSB'S STRIPPED IF
        THEY
        COULD FORM 1 TEXT CHARACTER, RAM CURSOR
        WILL BE INC. TO NEXT ADDR. BELOW THOSE
        READ, SIGN=1(+VE). IF THEY ARE TEL. NO.,
        RAM CURSOR WILL NOT MOVE & SIGN=0(-VE)
        LEVEL =1
READBL      LR      K,P
            PI      RAMWR
            CI      H'0B'
            BP      RDBL
            NI      H'03'
            SL      4
            LR      7,A
            PI      RAMWR
            AS      7
```

```
              LR    7,A
              PI
RDBL          PI    DECA
              LIS   8
              SL    4
              PI
        RSRCH SUBROUTINE SEARCHES FOR THE
        NEXT RECORD AND STOPS AT ITS BEGINNING,
        UNLESS EOF MARKER IS ENCOUNTERED.
        STATUS IS Z=0 FOR RECORD FOUND,
        Z=1 FOR EOF MARKER ENCOUNTERED.
        LEVEL=1.
RSRCH         LR    K,P
RREPT         PI    RAMWR
              CI    H'0B'
              BM    RNEXT
              CI    0
              BNZ   RREPT
              PI
RNEXT         PI    DECA
              OI    1
              PK
        SUBROUTINE TO READ TEL. NO.
        FROM EXTERNAL RAM AND STORE
        IT INTO THE DISPLAY BUFFER
        LEVEL : 1
        SUBROUTINE CALLED :
        SUBROUTINE CALLED :
        RAMWR
        LORAM
        PASS PARAMETER :
        PORT0,PORT1 : 1ST RAM LOC.
        RETURN PARAMETER :
        TEL NO IN DSP BUFFER
TELR          LR    K,P
              PI    CLRDSP
              LR    6,A         CLR RAM BYTE INDES
TELX          CLR
              LR    H'B',A      INITIALIZE R0B TO READ
              PI    RAMWR
              LR    1,A
              AS    1
              BNZ   TELZ        BR ON DIGIT NOT 0
TELW          PI    DECA
              PK
TELZ          AI    H'E9'
              BC    TELW        BR ON DIGIT
                                NON-NUMERIC
              PI    LORAM       CALL TO LOAD DATA
                                TO DSP
              BNZ   TELX        BR ON NOT LAST
TELY          PK                RETURN
        SUBROUTINE TO WRITE TEL. NO.
        STORED IN DISPLAY BUFFER TO
        EXTERNAL RAM
        LEVEL : 1
        SUBROUTINE CALLED:
        RAMWR
        PASS PARAMETER :
        PORT0,PORT1 : ADDRESS OF 1ST RAM LOC.
TWN           LR    K,P
TEL4          LISU  7
              LISL  7           PT FIRST DISPLAY
TEL3          LR    A,S
              OI    H'40'       INITIALIZE R0B FOR
                                WRITE
              LR    H'B',A
              PI    RAMWR       CALL TO WRITE A DIGIT
TEL2          LR    A,IS
              AI    H'FF'
              LR    IS,A
              CI    H'2F'       TEST FOR LAST
              BNZ   TEL2
TWEND         PK                RETURN
        SUBROUTINE SECTION FOR
        NAME DIALING
        TXTCHR LOADS ACC WITH 1 TEXT CHARACTER
        FROM THE DSP. BUFFER POINTED AT BY
        THE BUFFER CURSOR,STATUS REGISTER
        REFLECTS THE TRUE STATUS.
        LEVEL=2
TXTCHR        DI
```

```
              LI    H'3F'
              AS    10
              DS    10
              LR    IS,A
              CLR
              AS    S
              LR    6,A
              EI
              POP
```

From the foregoing detailed description of the repertory telephone dialer system of the present invention it will be apparent that the invention has a number of advantages, some of which have been described above and others of which are inherent in the invention. Also it will be apparent that modifications can be made to the dialer system without departing from the teachings of the invention. Accordingly, the scope of the invention is only to be limited as necessitated by the accompanying claims.

I claim:

1. A repertory automatic telephone dialing apparatus wherein a name and telephone number are searched by depressing one or more letter code keys comprising: a housing; a keyboard on said housing including pushbutton keys for at least all letters of the alphabet and numbers 0-9, and further including a NAME key, a SEARCH key, a DIAL key and a REDIAL key; a microprocessor situated in said housing including read only memory (ROM) and random access memory (RAM); a program in said microprocessor for operating the microprocessor to store in, or recall from, said RAM a name and telephone number pair; coupling circuit means for coupling the microprocessor to and between a telephone unit and an incoming telephone line; a keyboard circuit coupled between said keyboard and said microprocessor; said keyboard circuit in conjunction with said programmed microprocessor, being operable upon the depression of a key code to store a name/number pair, to recall a name/number pair or to cause dialing of a predetermined telephone number related to a code for the number when said code is punched in on said keyboard, said code including at least one letter associated with a pushbutton key which can be a letter of the name of the person being called; alphanumeric visual display means coupled to and between said microprocessor and said keyboard, and situated behind a screen on said housing above said keyboard for displaying names and numbers stored in said memory and for displaying the name and/or number being called when the code is punched in on said keyboard, means including said programmed microprocessor for causing, upon actuation of said NAME key, one of said letter keys and said SEARCH key, searching of a name, and, upon finding the desired name/number displaying said name/number on the visual display means, and, upon actuation of said DIAL key, dialing of the named person's telephone number; means including said programmed microprocessor for causing, upon actuation of one of said letter keys for a letter/name/number combination stored in said RAM, display of at least the telephone number on the visual display means and automatic dialing of said number; and means including said programmed microprocessor for causing, upon actuation of said REDIAL key, an alarm to be given after a short time period signifying that redialing of a last dialed number should be initiated.

2. The apparatus according to claim 1 wherein said housing has a seat on the top thereof upon which a telephone unit can be seated and two receptacles on the back thereof for receiving, respectively, a male connector at the end of a cable from the telephone unit and a male connector at the end of a telephone incoming line.

3. The dialer system according to claim 2 wherein said keyboard includes a CLOCK key which, in conjunction with the program in said microprocessor, can be actuated to cause the time of day to be displayed on said visual display means.

4. The apparatus according to claim 1 wherein said keyboard also includes a LIST/YES key which, in conjunction with the program in said microprocessor, can be actuated to cause a listing of name and number pairs on said alphanumeric visual display means.

5. The apparatus according to claim 1 wherein said code is one letter of the alphabet.

6. The apparatus according to claim 1 wherein said code is the first or given name of a person's name and number pair stored in said microprocessor.

7. The dialer system according to claim 1 wherein said keyboard also includes a "→" key which serves as a space key.

8. The apparatus according to claim 1 wherein said keyboard also includes a "!" key for storing emergency numbers.

9. The apparatus according to claim 1 wherein said keyboard also includes a "*" key for creating a pause in the number dialed such as after dialing a "9" to interconnect with another telephone system.

10. The apparatus according to claim 1 wherein said keyboard also includes a "#" key for prolonging ringing of a number called (dialed) by the dialer system.

11. The apparatus according to claim 1 wherein said keyboard also includes an ELAPSE TIMER key, which, in conjunction with the program stored in said microprocessor, can be actuated to time the call from the beginning of the call to the end of the call and show the elapsed time on the alphanumeric visual display means.

12. The apparatus according to claim 1 wherein said keyboard also includes a STORE key, an ENTER key, a DELETE key and a reset key which, in conjunction with the program in said microprocessor, can be actuated to enter, store or delete name and number pairs and/or to reset the apparatus.

13. The apparatus according to claim 1 including an LED on said housing and a speaker positioned behind a grating in a wall of said housing coupled to said microprocessor, said LED being energized on the dialing of a number so as to blink as the number is called and said speaker being energized on the dialing of a number so the ringing of a number and the answering of the call can be heard without lifting the handset off of the "hook" in the cradle of the telephone unit.

14. The apparatus according to claim 1 wherein said coupling circuit means include a Line Control circuit and a Status Sensor circuit serially connected between the incoming telephone line and the telephone unit and coupled to said microprocessor.

15. The apparatus according to claim 14 including an Audio Monitor circuit which is coupled to said Line Control circuit and to a speaker and which can be coupled by said apparatus to the incoming lines for supplying a ringing tone and the answering voice to the speaker such that the telephone handset does not have to be picked up until the call is answered and which can be disconnected from the apparatus when the telephone handset is raised off the hook.

16. The apparatus according to claim 15 including a relay system, whch is coupled to and between the Line Control circuit, the Audio Monitor circuit, the Status Sensor circuit and the microprocessor and which is operated by the apparatus to cause the coupling and uncoupling of the Audio Monitor circuit to and from the apparatus.

17. The apparatus according to claim 16 including means for maintaining line connection between a telephone unit and an incoming telephone line when the telephone handset is lifted off the "hook" and the Audio Monitor circuit is uncoupled from the apparatus by the relay system.

18. The apparatus according to claim 15 including an Alarm Generator circuit coupled between the microprocessor and the Audio Monitor circuit for causing the Audio Monitor circuit to ignore incoming audio signals and supplying an alarm to the speaker such as when a redial timer function program in the microprocessor times out.

19. The apparatus according to claim 14 including a Tone Dialer circuit coupled between the Line Control circuit and the microprocessor and which is operated by the apparatus to supply appropriate pulse tones to the incoming telephone lines.

20. The apparatus according to claim 19 including an address bus coupled to, between said microprocessor and said tone dialer and said display means, and decoder circuitry coupled to and between said microprocessor, said keyboard and said display means.

21. The apparatus according to claim 1 including a main power supply and back up battery power supply circuit for maintaining power to the memories in the microprocessor in the event of a power outage thereby to prevent loss of the contents of the memories.

* * * * *

UNITED STATES PATENT AND TRADEMARK OFFICE
CERTIFICATE OF CORRECTION

PATENT NO. : 4,475,013
DATED : October 2, 1984
INVENTOR(S) : Thomas K. P. Lee, et al.

Page 1 of 2

It is certified that error appears in the above-identified patent and that said Letters Patent is hereby corrected as shown below:

Om the face sheet, second column, under "Attorney, Agent or Firm", "Thomas R. Virgil" should have been --Thomas R. Vigil--.

Column 3, line 53, "initialed" should have been --initiated--.

Column 11, line 4, "and" should have been --any--.

Column 14, line 14, "before Fig." insert --In--.
line 15, after "is" insert --a--.

Column 17, line 57, "call" should have been --called--.

Column 19, line 62, before "accept" delete "a".

Column 26, line 14, "PM/" insert --Am--.

Column 27, line 6, delete "140".

Column 29, line 18, "COM6" should have been --COM6--.
line 47, "COM4" should have been --COM4--.

Column 34, line 61, before "FLAG" insert --NAME--.

UNITED STATES PATENT AND TRADEMARK OFFICE
CERTIFICATE OF CORRECTION

PATENT NO. : 4,475,013                                     Page 2 of 2

DATED      : October 2, 1984

INVENTOR(S) : Thomas K. P. Lee, et al.

It is certified that error appears in the above-identified patent and that said Letters Patent is hereby corrected as shown below:

```
Column 36, line 21, before "H." delete "cl".
           line 58, before "LISU" insert --DI--.
Column 37, line 41, delete "125".
Column 48, line 19, "whch" should have been --which--.
```

Signed and Sealed this

Twenty-second Day of October 1985

[SEAL]

Attest:

DONALD J. QUIGG

Attesting Officer

Commissioner of Patents and
Trademarks—Designate